(12) United States Patent
Oswal et al.

(10) Patent No.: US 11,706,591 B2
(45) Date of Patent: Jul. 18, 2023

(54) METHODS TO ENABLE WI-FI ONBOARDING OF USER EQUIPMENT BY UTILIZING AN ESIM

(71) Applicant: Cisco Technology, Inc., San Jose, CA (US)

(72) Inventors: Anand Oswal, Pleasanton, CA (US); Rajesh S. Pazhyannur, Fremont, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/895,695

(22) Filed: Jun. 8, 2020

(65) Prior Publication Data
US 2021/0112382 A1 Apr. 15, 2021

Related U.S. Application Data

(60) Provisional application No. 62/913,732, filed on Oct. 10, 2019.

(51) Int. Cl.
| | |
|---|---|
| *H04W 4/14* | (2009.01) |
| *H04W 8/18* | (2009.01) |
| *H04L 9/40* | (2022.01) |
| *H04W 12/069* | (2021.01) |

(52) U.S. Cl.
CPC .......... *H04W 4/14* (2013.01); *H04L 63/0823* (2013.01); *H04W 8/183* (2013.01); *H04W 12/069* (2021.01)

(58) Field of Classification Search
CPC ..... H04W 4/14; H04W 12/069; H04W 8/183; H04L 63/0823
USPC ........................................................ 455/466
See application file for complete search history.

(56) References Cited

U.S. PATENT DOCUMENTS

| | | | |
|---|---|---|---|
| 9,980,142 B2 | 5/2018 | Beals | |
| 10,299,123 B2 | 5/2019 | Vasudevan et al. | |
| 10,341,328 B2 | 7/2019 | Gupta et al. | |
| 10,574,465 B2 | 2/2020 | Li et al. | |
| 2011/0131638 A1* | 6/2011 | Kan | G06Q 20/425 726/6 |
| 2014/0115676 A1* | 4/2014 | Coghlan | H04W 12/069 726/6 |
| 2018/0124608 A1 | 5/2018 | Huang | |

* cited by examiner

*Primary Examiner* — Chuck Huynh
(74) *Attorney, Agent, or Firm* — Polsinelli

(57) ABSTRACT

Systems and methods are provided for providing, by a user equipment, a short message service (SMS) message to initiate Wi-Fi onboarding to a mobile network, receiving, by the user equipment, a binary SMS message including a request for a certificate signing request by a server, generating, by the user equipment, the certificate signing request based on the request for the certificate signing request of the binary SMS message, providing, by the user equipment, the certificate signing request to the mobile network, and receiving, by the user equipment, a binary SMS message including Wi-Fi login data based on the certificate signing request provided to the mobile network.

20 Claims, 23 Drawing Sheets

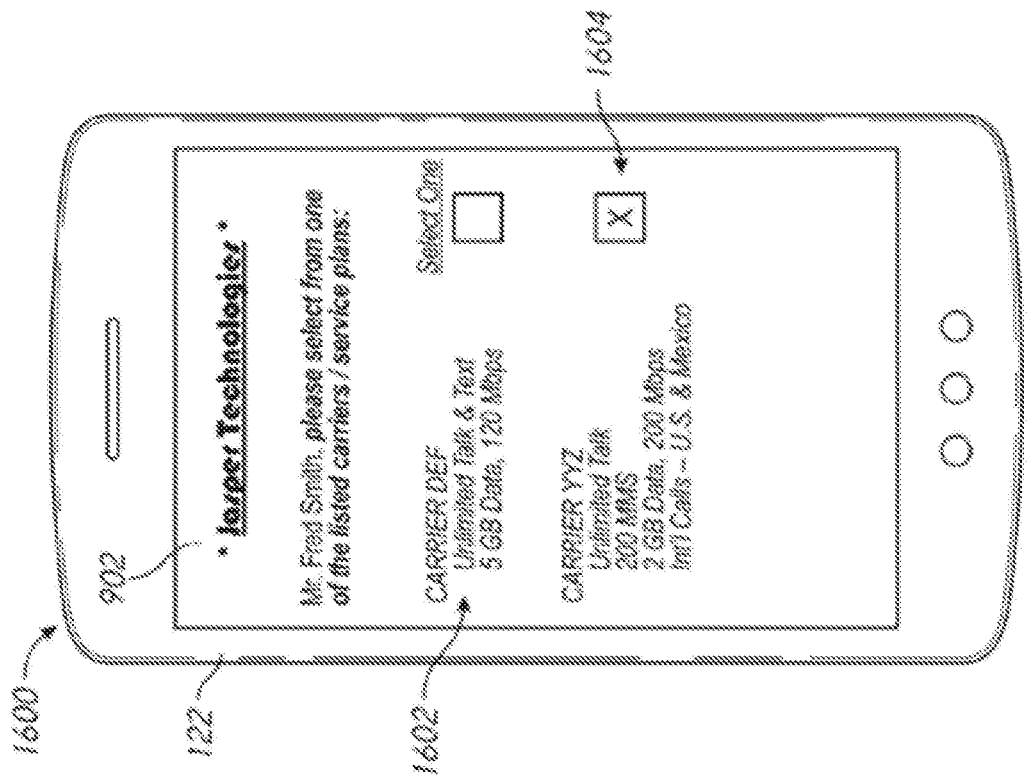
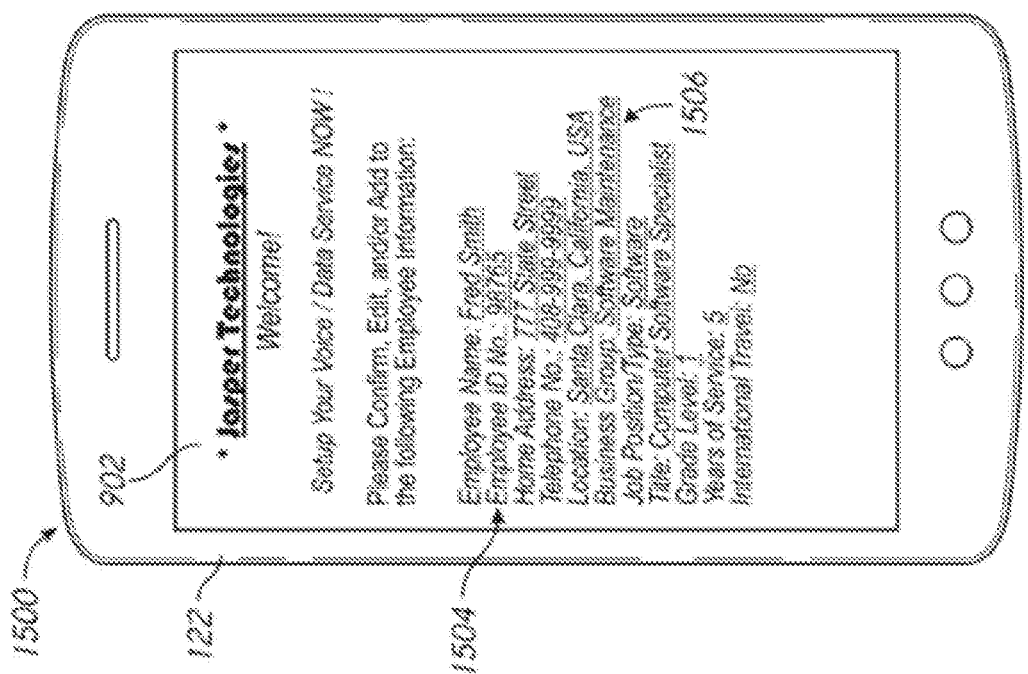
FIG. 15
FIG. 16

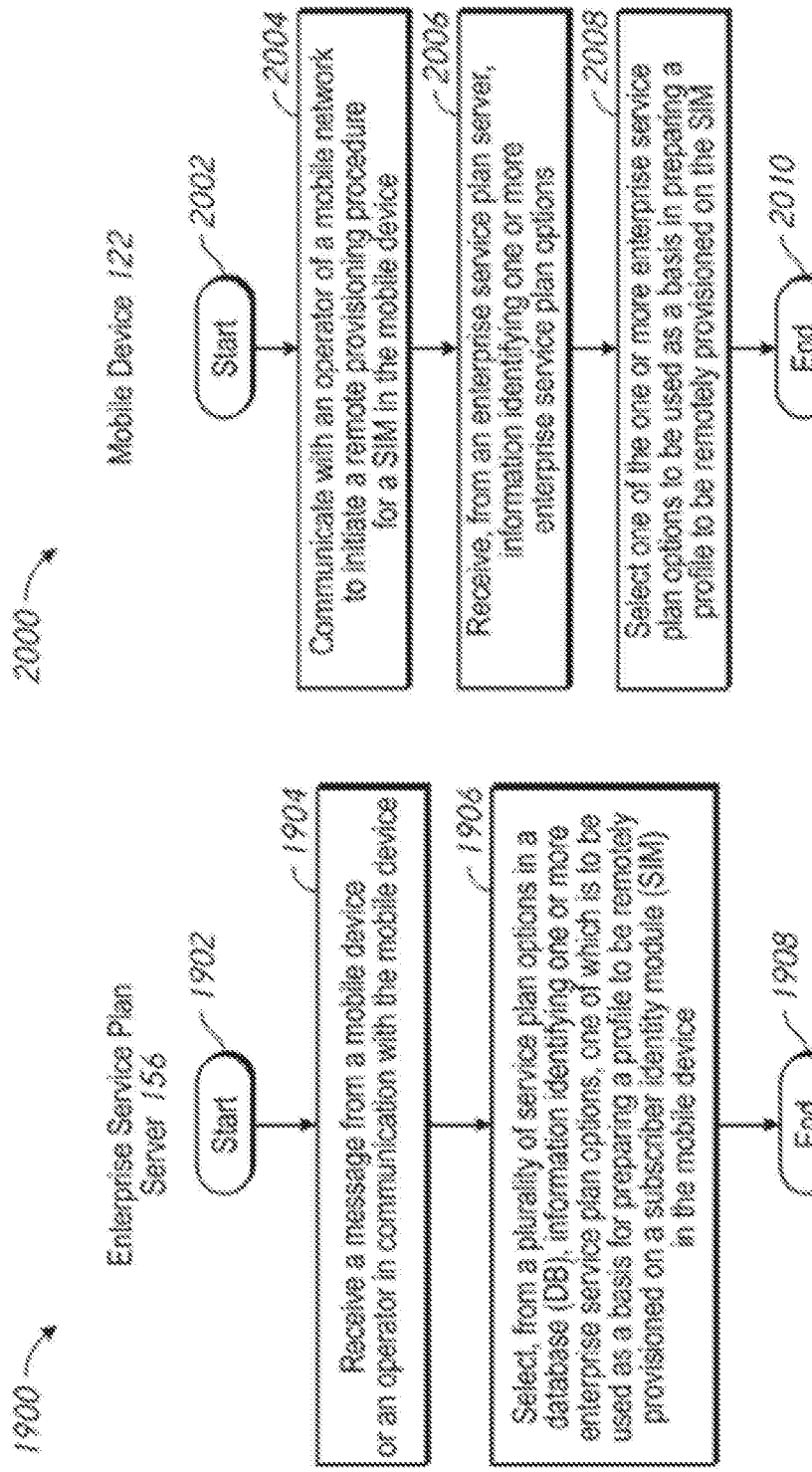

METHODS TO ENABLE WI-FI ONBOARDING OF USER EQUIPMENT BY UTILIZING AN ESIM

CROSS-REFERENCE TO RELATED APPLICATIONS

This application claims priority to U.S. Provisional Patent Application No. 62/913,732, filed on Oct. 10, 2019, the content of which is incorporated herein by reference in its entirety.

TECHNICAL FIELD

The subject matter of this disclosure relates in general to the field of Wi-Fi onboarding, and more particularly, to systems and methods for Wi-Fi onboarding of a cellular device using an embedded Subscriber Identity Module (eSIM).

BACKGROUND

A computer network is a geographically distributed collection of nodes interconnected by communication links and segments for transporting data between electronic devices. Many types of networks are available, with the types ranging from Personal Area Networks (PANs) and Local Area Networks (LANs) to Wide Area Networks (WANs) and the Internet. PANs can connect devices in or on a user's body or located within close proximity to the user. LANs can connect nodes over dedicated private communications links located in the same general physical location, such as a building or campus. WANs can connect geographically dispersed devices over long-distance communications links, such as common carrier telephone lines, optical light paths, Synchronous Optical Networks (SONETs), Synchronous Digital Hierarchy (SDH) links, and so forth. LANs and WANs can include Layer 2 (L2) (of the Open Systems Interconnection (OSI) model) and/or Layer 3 (L3) networks and devices. The Internet is an example of a WAN that connects disparate networks throughout the world, providing global communication between nodes on various networks. The nodes can communicate by exchanging discrete frames or packets of data. Computer networks may be further interconnected by an intermediate node or network device, such as a switch, router, hub, bridge, and so forth, to extend the effective size of each network.

The endpoints that make up a computer network can include servers, desktop computers, laptops, tablets, smart phones, wearable devices (e.g., smart watches; smart eyeglasses or other head-mounted displays; smart in-ear, on-ear, over-ear devices; etc.) and Internet of Things (IoT) devices. Some endpoints may connect to the computer network wirelessly using various protocols and technologies, such as Institute of Electrical and Electronic Engineers (IEEE) 802.11x or other Wi-Fi networks; 2G, 3G, 4G, 5G, Global System for Mobile Communications (GSM), General Packet Radio Service (GPRS), Long Term Evolution (LTE), or other cellular networks; Citizens Broadband Radio Service (CBRS) (sometimes also referred to as private LTE); BLUETOOTH, ZIGBEE, Z-WAVE, or other Wireless Personal Area Networks (WPANs); infrared; and so forth.

Before an endpoint can connect to the nodes of a computer network, a device may go through an onboarding process. Onboarding cellular devices may be quick and seamless for users as cellular devices have network credentials stored on the SIM card/eSIM. As a result, a user does not have to manually enter any credentials to enable access to a cellular network. The same is not true for cellular devices attempting to access a Wi-Fi network. Instead, users have to go through various complicated steps including manually entering credentials in order to onboard cellular devices onto a Wi-Fi network. Therefore, a need exists for a more seamlessly onboarding process of a device, and in particular a cellular device, onto a Wi-Fi network.

BRIEF DESCRIPTION OF THE FIGURES

To provide a more complete understanding of the present disclosure and features and advantages thereof, reference is made to the following description, taken in conjunction with the accompanying drawings, in which:

FIG. 9 illustrates a display of employee information to be entered, confirmed, edited, and/or added to, and FIG. 10 illustrates a display of resulting enterprise service plan options from which to select, according to some aspects of the disclosed technology;

FIGS. 15 and 16 illustrate another pair of illustrations of the user interface of the mobile device like FIGS. 9-14, showing another illustrative example of information which may be conveyed using the techniques described herein, according to some aspects of the disclosed technology;

FIG. 19 illustrates a flowchart for describing a method for use in provisioning a SIM associated with an enterprise, according to some aspects of the disclosed technology;

FIG. 20 illustrates a flowchart for describing a method for use in provisioning a SIM associated with an enterprise, according to some aspects of the disclosed technology;

DESCRIPTION OF EXAMPLE EMBODIMENTS

Figure 1A:
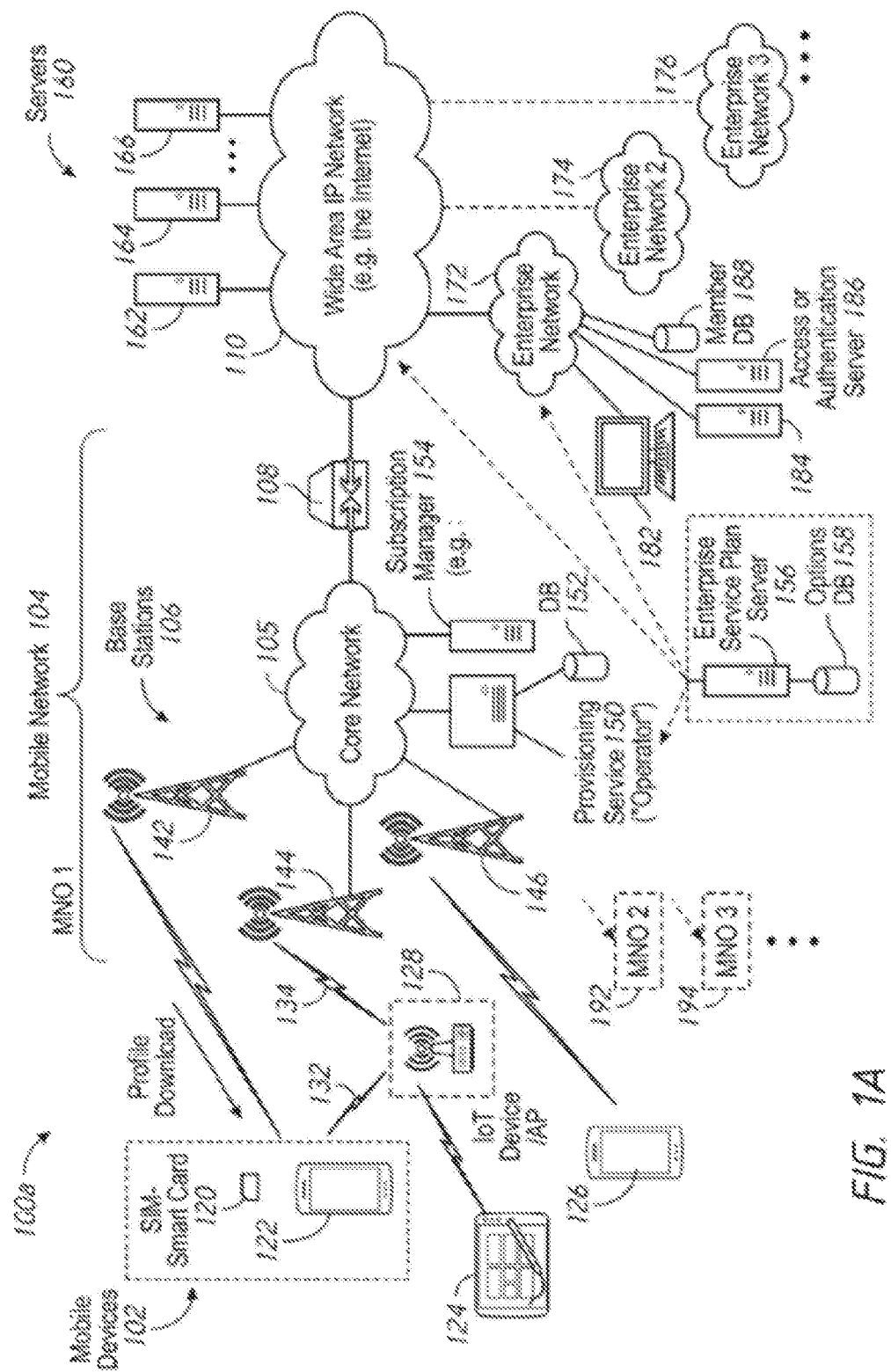
FIG. 1A is a diagram of a communication system which illustrates one type of environment within which techniques of the present disclosure may be employed, where a provisioning service may be utilized with an enterprise server for onboarding IoT devices including embedded Subscriber Identity Module (eSIMs), according to some aspects of the disclosed technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for improving onboarding of a cellular device to an enterprise network. A cellular device can send a Short Message Service (SMS) message, including a username, to a mobile or cellular network. The mobile network can send a username and the phone number of the cellular device to an enrollment server of the enterprise network. The enrollment server can validate the username and eligibility of the cellular device. The enrollment server can send to the mobile network a binary SMS signifying to start Wi-Fi enrollment. The mobile network can provide the binary SMS message to the cellular device. The cellular device can forward the SMS to an applet running on an embedded Subscriber Identity Module (eSIM) of the cellular device. The eSIM can generate a binary SMS certificate signing request (CSR) and send it to the cellular device. The cellular device can provide the binary SMS CSR to the mobile network, which can then forward the CSR to the enrollment server. The enrollment server can use the SMS CSR to create a certificate and register the cellular device with the user. Specifically, the enrollment server can update a whitelist for a WLAN of the enterprise network to include the cellular device. The enrollment server can send a Wi-Fi profile and the certificate to the mobile network, as part of a binary SMS. The mobile network can transmit the Wi-Fi profile and the certificate to the cellular device. The cellular device can transmit the Wi-Fi profile and the certificate to the eSIM. The eSIM can store the Wi-Fi profile for connecting the cellular device to the WLAN.

Example Embodiments

Endpoints typically use an operational user profile to access a private network. The operational user profile may be deployed in a Subscriber Identity Module (SIM) by a provisioning server associated with the private network operator. The provisioning server (e.g., a Subscription Management Data Preparation (SM-DP) platform) is typically accessed via either a side channel (e.g., Wi-Fi, BLUETOOTH, LTE in CBRS, etc.) or a bootstrapping profile provided by a Mobile Network Operator (MNO). The bootstrapping profile may enable the endpoint to obtain a network address and contact an SM-DP associated with the private network operator, which deploys an operational profile in the SIM of the endpoint.

Onboarding cellular devices is quick and seamless for users as cellular devices have network credentials on the SIM card/eSIM. As a result, a user does not have to enter any credentials manually to enable access to a cellular network. The same is not true for devices accessing a Wi-Fi network. Instead, users have to go through various steps including manually entering credentials in order to onboard devices for a Wi-Fi network. There therefore exist needs for more seamlessly onboarding a device, and in particular a cellular device, for a Wi-Fi network.

FIG. 1A

Referring now to FIG. 1A, a diagram of a communication system 100 illustrating one type of environment within which techniques of the present disclosure may be employed is shown. While pertinent features are illustrated in FIG. 1A and the other Figures, those of ordinary skill in the art will appreciate from the present disclosure that various other features have not been illustrated for the sake of brevity and so as not to obscure more pertinent aspects of the example implementations disclosed herein.

Communication system 100 of FIG. 1A may generally include a mobile communication network ("mobile network") 104 connected to a WAN 110, such as the Internet. Mobile network 104 may be a Wireless WAN (WWAN), such as a cellular telecommunications network. Mobile network 104 may include a plurality of base stations 106, such as base stations 142, 144, and 146, connected to a core network 105. Mobile network 104 may be associated with a Mobile Network Operator (MNO) (e.g. "MNO 1"). Note that, although the general structure of a single mobile network 104 of MNO 1 is shown, mobile networks of other MNOs, such as MNO 192 ("MNO 2) and MNO 194 ("MNO 3"), may also be a part of communication system 100.

A plurality of mobile communication devices 102 shown in FIG. 1A may include mobile devices 122, 124, and 126. In general, mobile devices 102 may be cellular telephones, smartphones, laptop computers, tablet computers, Personal Digital Assistants (PDAs), and IoT devices to name but a few. Some of these mobile devices 102, such as mobile devices 122 and 126, may communicate with mobile network 104 directly through base stations 106, such as base stations 142 and 146, respectively.

WAN 110 may be a packet data network. A plurality of servers 160, such as servers 162, 164, and 166 a may be connected to network 110. In FIG. 1A, a gateway 108 is shown to connect the core network 105 to network 110. Gateway 108 is an interface between mobile network 104 and network 110, for facilitating communications between mobile devices 102 and servers/devices in network 110. Gateway 108 may be a packet gateway (PGW).

In FIG. 1A, at least one of the mobile devices, such as device 128, may be an IoT device. In the example of FIG. 1A, device 128 is an IoT device equipped with multiple communication capabilities (e.g., cellular, Wi-Fi, LTE, etc.) to operate as a mobile Access Point (AP), thereby providing a mobile "hotspot" for communication devices. For example, device 128 may be incorporated in a system of a vehicle (e.g. a "connected car") to provide a continuous hotspot in a mobile environment. Accordingly, device 128 may be configured to provide wireless communications over a first wireless connection 132 with a mobile device (e.g. mobile device 122) according a first communication protocol or standard, and provide wireless communications over a second wireless connection 134 with a mobile network (e.g. mobile network 104) according to the second communication protocol or standard.

In some implementations, the first communication protocol of device 128 may be for a proximal network protocol, including but not limited to WLAN protocols (e.g., IEEE 802.11), CBRS or private LTE protocols, PAN protocols (e.g., ZIGBEE, BLUETOOTH, etc.), and so forth. The second communication protocol of device 128 may be any suitable cellular telecommunications protocol or standard described in one of several various sets of specifications. Thus, first wireless connection 132 of device 128 may be a proximal network connection, and second wireless connection 134 of device 128 may be cellular network connection.

In FIG. 1A, a mobile device may operate for communications in a mobile network with use of a smart card. For example, mobile device 122 may operate with use of a smart card 120 for services in mobile network 104 provided by MNO 1. Smart card 120 includes a Subscriber Identity Module (SIM). A SIM is an application which executes on a (e.g. secure) microprocessor, often on a smart card, to provide a device with secure, identifiable, and authenticated access to a mobile network. For instance, a SIM securely stores an International Mobile Subscriber Identity (IMSI) number and related key, which are used to identify and authenticate a subscriber on a mobile network. In some implementations, smart card 120 may be a Universal Integrated Circuit Card (UICC) or an embedded UICC (eUICC). Here, smart card 120 may include a SIM that is and/or is referred to as a Universal SIM (USIM), an IP Multimedia SIM (ISIM), a CDMA SIM (CSIM), or other suitable and/or suitably-named module. In some implementations, the SIM is provided as a "soft SIM" where SIM software is embedded and running on another trusted, secure environment in the device itself. Thus, although the description may indicate a specific implementation where the SIM is provided on a smart card/UICC, it should be understood and appreciated that the SIM may alternatively run in software or on its own silicon that is not part of a smart card/UICC.

A SIM may be provisioned with a profile. A profile may refer to a combination of operator data and applications to be provisioned for the purposes of providing identity, authentication, and other services to a device by the operator. A profile may be configured to enable communication and connectivity in support of a subscription which relates to the commercial relationship between a subscriber and a service provider (e.g. the operator or as associated third party). Traditionally, a SIM may be provisioned with only a single profile, such that the profile is "locked" to the SIM (i.e. if a subscriber wishes to change operators, the card needs to be replaced).

In some implementations of the present disclosure, a SIM may be provisioned with profiles of multiple providers. In addition, provisioning may be performed for use of a specific SIM profile or to change SIM profiles at most anytime, without the need for physically replacing any existing card. What is provided as described herein is a secure, provisioning (e.g. Over-The-Air or "OTA" provisioning on wireless networks) of SIMs with profiles for mobile devices associated with enterprises.

In general, provisioning refers to a process of preparing and equipping a particular device and/or network so that the device may receive new services on the network. In some implementations, the provisioning of SIMs in communication system 100 conforms to the requirements of "Remote SIM Provisioning." Remote SIM provisioning refers to a protocol for the remote provisioning of a SIM in a device, described in one or more specifications developed by the GSM Association.

For the provisioning of profiles, mobile network 104 of FIG. 1A may include a provisioning service 150 of the operator and a subscription manager (SM) 152. Note that the provisioning service 150 and SM 152 may be run by the operator themselves or, alternatively, by a trusted third party on behalf of the operator (e.g. a cloud provisioning service). The term "operator" is intended to include a trusted third party.

Provisioning service 150 is configured to generally facilitate the provisioning of SIMs so that devices may receive services on a mobile network. Provisioning service 150 maintains access to a database (DB) 152 for use in provisioning. Subscription manager 152 is configured to specifically prepare the profiles of SIMs to be provisioned on the smart cards of devices. In some implementations, subscription manager 152 may be or include a Subscription Manager Data Preparation (SM-DP) function or module.

Smart card 120 and/or mobile device 122 may be owned and/or controlled solely by a user or subscriber, for example, for personal use. On the other hand, smart card 120 and/or mobile device 122 may be owned and/or controlled by an enterprise (i.e. an organization, such as a business organization). In such a case, the user or subscriber may be and/or be referred to as a member, an employee, a contractor, or a volunteer of the enterprise.

An enterprise may own, control, and/or operate a private communication network, such as an enterprise network 172 of FIG. 1A. Enterprise network 172 may be connected to network 110 for communication accessibility. Enterprise network 172 may include a plurality of various devices connected therein, including computers or terminals (e.g. a terminal 182) and servers (e.g. a server 184). Enterprise network 172 may have an access or authentication server 186 configured to provide restrictions and access to data and/or services in enterprise network 172 (e.g. authentication based on (e.g. enterprise) login credentials or other suitable challenge/response procedure). Enterprise network 172 may also have a member database (DB) 188) which stores information associated with a plurality of members of the enterprise. Note that, although the general structure of only a single enterprise network 172 is shown and described, other similarly-arranged enterprise networks, such as enterprise networks 174 and 176, may also be a part of communication system 100.

Where one or more enterprises may own and/or control smart card 120 and/or mobile device 122, communication system 100 may further include an enterprise service plan server 156. Enterprise service plan server 156 maintains access to a database (DB) 158 for use in the management and selection of enterprise service plan options of the one or more enterprises. Enterprise service plan server 156 may be connected in an enterprise network, such as enterprise network 172. In some implementations, however, enterprise service plan server 156 may be a part of the provisioning service 150 of the operator or connected to network 110 for (general) access. Enterprise service plan server 156 is described later in more detail in relation to FIGS. 6(*a*) and 6(*b*).

FIG. 1B

As described previously, the provisioning of SIMs in communication system 100 may conform to the requirements of Remote SIM Provisioning (RSP), referring to a protocol for the remote provisioning of a SIM in a mobile device described in one or more specifications developed by the GSM Association. What is shown in FIG. 1B is a block diagram 100*b* of the entities and interfaces which may be utilized in association with RSP according to some implementations of the present disclosure.

Figure 1B:
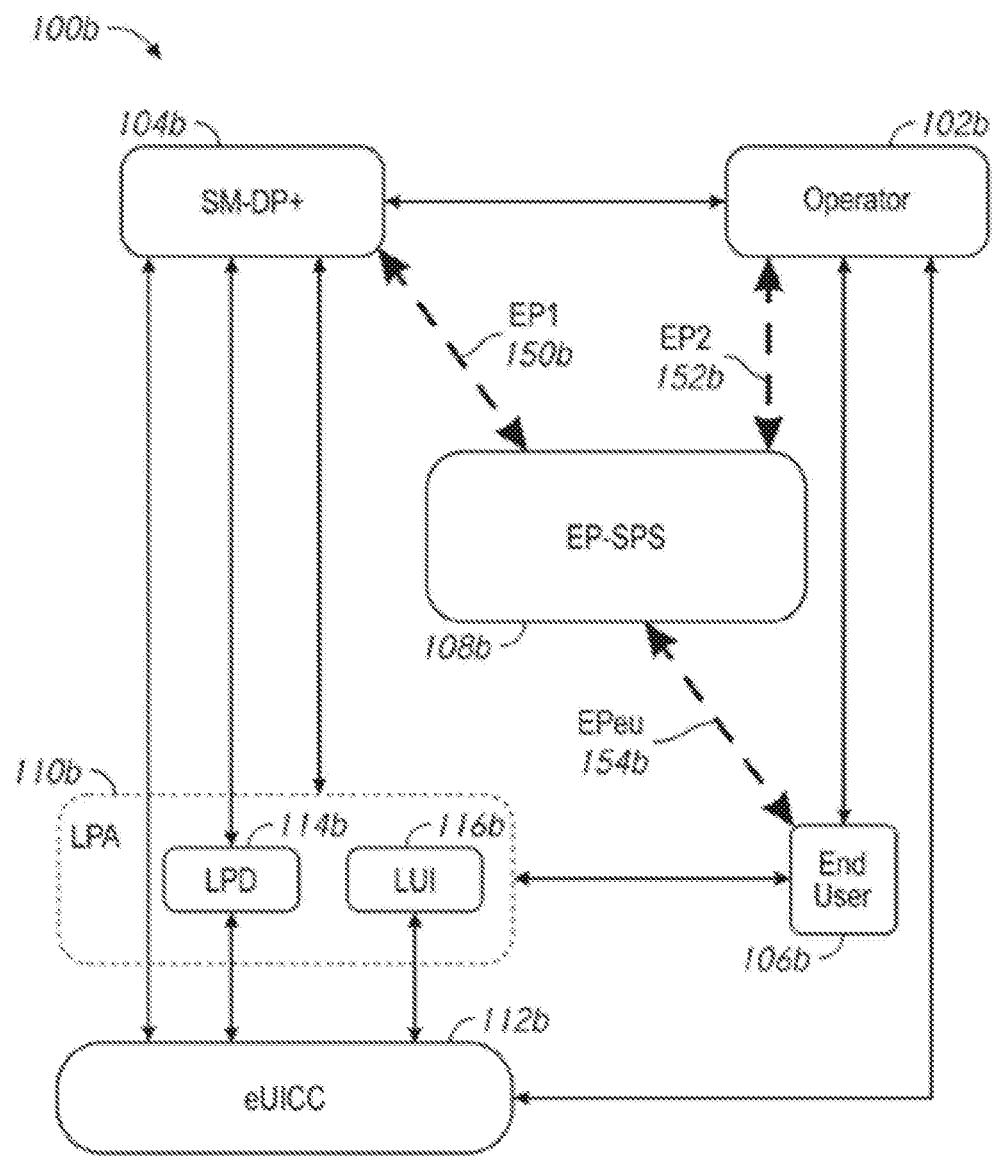
FIG. 1B illustrates a block diagram of the architecture and interfaces which may be utilized for provisioning IoT devices according to some implementations of the present disclosure, according to some aspects of the disclosed technology.

The entities of FIG. 1B include an operator 102*b*, a Subscription Manager—Data Preparation (SM-DP) 104*b*, an end user 106*b*, a local profile assistant (LPA) 110*b* which includes a local profile download (LPD) 114*b* and a local user interface (LUI) 116*b*, and an eUICC 112*b*.

In addition, the entities of FIG. 1B include an Enterprise Policy for SIM Profile Selection (EP-SPS) module 108*b* of the present disclosure. EP-SPS module 108*b* may be configured to perform the techniques of the present disclosure for one or more enterprises as described in relation to the remaining figures. EP-SPS module 108*b* has one or more interfaces including an interface 150*b* with SM-DP 104*b* referred to as EP1, an interface 152*b* with operator 102*b* referred to as EP2, and an interface 154*b* with end user 106*b* referred to as Epeu.

To briefly illustrate particular techniques of the present disclosure in the context of the architecture and interfaces of FIG. 1B, a provisioning procedure will now be described. In FIG. 1B, end user 106*b* attempts to activate a new device (e.g. a User Equipment or "UE") with eUICC 112*b* that is managed by an enterprise. Operator 102*b* identifies that the IMSI received from the UE is associated with the enterprise and managed by that enterprise's EP-SPS module 108*b*. In response, operator 102*b* may redirect the UE's LUI 116*b*/LPA 110*b* to the interface EPeu interface 154*b* for communication with EP-SPS module 108*b*. Alternatively, operator 102*b* may communicate indirectly with EP-SPS module 108*b* via the EP2 interface 152*b* to obtain the selections available to end user 106*b*.

When EP-SPS module 108*b* has more than one option for end user 106*b*, end user 106*b* is presented a list of appropriate options. These options may come directly from EP-SPS module 108*b* via Epeu interface 154*b* or indirectly via EP2 interface 152*b* presented as Operator Ux interface ESop. The options provided may be generated dynamically and interactively for a specific end user 106*b*, and may be based on one or more characteristics and/or policies of the enterprise (e.g. a member/employment type, a member/employment department, a characteristic or indicator indicative of intended contextual use, such as a location or geographic indictor or setting, a language indicator or setting, a device capability indicator such as a voice and/or data communication capability indicator, a device type or setting, etc.).

Upon manual selection from the Ux, it will act as a proxy for the subscriber and initiate a profile download activation code procedure via EP2 interface 152*b* to operator 102*b*, or via a direct interface to SM-DP 104*b* via EP1 interface 150*b*. It will then return the appropriate activation code to end user 106*b* for manual input to LUI 116*b*/LPA 110*b* (directly if EP1 interface 150*b* was used, otherwise indirectly via operator 102*b* if EP2 interface 152*b* was used), or send the appropriate activation code to LPA 110*b* directly. Alternatively, it will complete the activation and profile download process as if the device has no LPA/LUI, which is often the case with an embedded SIM in an IoT device.

More detailed operation associated with the entities and interfaces of FIGS. 1(*a*) and 1(*b*) will now be described in relation to the remaining figures.

FIG. 2

Figure 2:
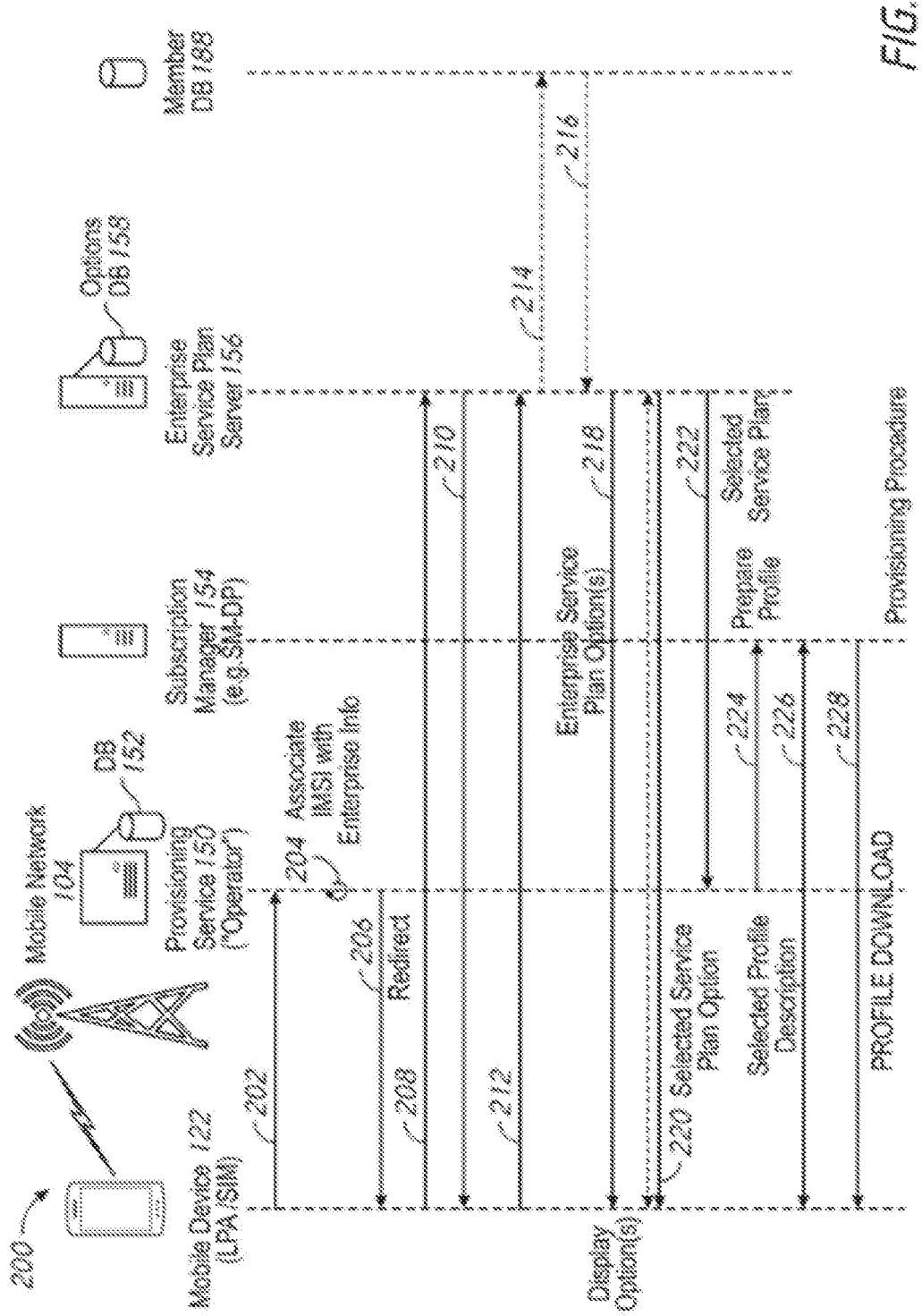
FIGS. 2 and 3 illustrate message flow diagrams for describing methods for use in remotely provisioning a SIM associated with an enterprise, according to some aspects of the disclosed technology.

FIG. 2 is a message flow diagram 200 for describing a method of provisioning a SIM in a communication system (e.g. communication system 100 of FIG. 1A). In particular, the method of FIG. 2 may be for use in provisioning a SIM for a mobile device (e.g. mobile device 122), where the SIM is associated with (e.g. being owned and/or controlled by) an enterprise (i.e. a business organization) having an enterprise network (e.g. enterprise network 172). Although this description may indicate a specific implementation where mobile device 122 is provisioned via a mobile network of an MNO, the mobile device may be similarly remotely provisioned via any suitable network, including the Internet. Also note that although enterprise service plan server 156 is shown in FIG. 2 in communication with a single mobile network 104 of MNO 1, the server 156 may alternatively be in communication with multiple networks of multiple MNOs (e.g. MNO 1, MNO 2, MNO 3, etc.) as needed.

In the description of FIG. 2, provisioning service 150 (the "operator"), subscription manager 154, enterprise service plan server 156, and/or combinations thereof, may be configured to perform techniques of the present disclosure. In the method of FIG. 2, enterprise service plan server 156 is configured to communicate with mobile device 122 for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172).

In an effort to obtain communication service, a user turns on mobile device 122 which includes a previously-unused SIM. In response, mobile device 122 communicates one or more messages in an attempt to connect with mobile network 104 (step 202 of FIG. 2). Mobile network 104 will serve as a default network for provisioning the mobile device 122. In this step, mobile device 122 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 204 of FIG. 2).

In the present case, smart card 120 and/or mobile device 122 may be owned and/or controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more data items including Enterprise ID 1, Enterprise Name 1, Address 1 of Server, and Credentials 1.

In response to identifying the association, provisioning service 150 causes a message to be sent to mobile device 122 for redirecting the mobile device 122 (step 206 of FIG. 2). Specifically, the message may redirect the mobile device 122 to enterprise service plan server 156. For example, in step 206, provisioning service 150 may cause one or more data items, such as Enterprise ID 1, Enterprise Name 1, Address 1 of Server, Credentials 1, or any combination of the above, to be sent to mobile device 122. Note that the "Address 1 of Server" may be the address of enterprise service plan server 156, and the Enterprise ID 1 and the Enterprise Name 1 may each identify the enterprise associated with the received IMSI of smart card 120. In response to receiving the message, mobile device 122 may be redirected to enterprise service plan server 156, and send one or more messages to enterprise service plan server 156, based on the received data items (step 208 of FIG. 2). The enterprise service plan server 156 may respond to mobile device 122 (step 210 of FIG. 2) to establish a communication session with mobile device 122.

Next, mobile device 122 may send a request to enterprise service plan server 156 (step 212 of FIG. 2). The request may be, for example, a request for enterprise service plan options. In response, enterprise service plan server 156 may access options DB 158 to select one or more enterprise service plan options from a plurality of service plan options in options DB 158. Enterprise service plan server 156 may select the one or more enterprise service plan options in options DB 158 based on one or more selected characteristics of a member and/or of a member's association or relationship with an enterprise. Enterprise service plan server 156 may then send one or more messages to mobile device 122 in response to the request, where the one or more messages include information identifying the selected one or more enterprise service plan options available to the user on that device (step 218 of FIG. 2).

Mobile device 122 may receive the information identifying the selected one or more enterprise service plan options from enterprise server. The selected one or more enterprise service plan options may be displayed in a user interface (e.g. a visual display, or touch screen display) of mobile device 122. The user of mobile device may select one of the one or more enterprise service plan options via the user interface. In response to the selection, mobile device 122 may send to enterprise service plan server 156 the information identifying the user's selected enterprise service plan (step 220 of FIG. 2). In some implementations, the user's selected plan involves multiple iterations or steps, where the user narrows the options by answering one or more questions and/or selecting one or more additional characteristics or features.

In some implementations, enterprise service plan server 156 may select the one or more enterprise service plan options based on the IMSI or other identifier received from mobile device 122. In addition, or alternatively, enterprise service plan server 156 may select the one or more enterprise service plan options based on one or more characteristics of the member (i.e. the user of mobile device 122) and/or of the member's association or relationship with the enterprise. Thus, the one or more enterprise service plan options may be selected as a function of member variables (e.g. one or more characteristics of the member, or of the member's association or relationship with the enterprise). The one or more characteristics may be received from mobile device 122 or through an alternative (e.g. out-of-band) channel.

In some implementations, enterprise service plan server 156 may access member DB 188 for the selection and receipt of the one or more characteristics of the member or the member's association or relationship with the enterprise (see steps 214 and 216 of FIG. 2). These one or more selected characteristics may be used in the selection of the one or more enterprise service plan options from options DB 158. Here, enterprise service plan server 156 may select the one or more characteristics of the member from member DB 188 based on, for example, a member name or member ID of the member of the enterprise (i.e. the user of mobile device 122). The member name or member ID may be received from mobile device 122 or through an alternative (e.g. out-of-band) channel.

Note that, when accessing its options DB 158, enterprise service plan server 156 may identify only a single enterprise service plan option from options DB 158. Here, enterprise service plan server 156 may still send information identifying the single enterprise service plan option for display at mobile device 122, where the user merely provides a confirmation of the selected enterprise service plan option. Alternatively, enterprise service plan server 156 may refrain from sending the information to mobile device in step 218, and proceed directly to step 222 of FIG. 2, thereby automatically performing the selection on behalf of mobile device 122.

In some implementations, the one or more characteristics used to select the one or more enterprise service plan options may additionally or alternatively include those indicative of intended contextual use, such as any one or more of a location or geography indicator (e.g. based on GPS coordinates, cell tower, IP address, etc.), a language indicator, a device capability indicator such as a voice and/or data communication capability indicator, etc., indicators that may be received via user input or from the device itself and/or its applications.

After receipt of the information identifying the user's selected enterprise service plan in step 222, enterprise service plan server 156 may send to provisioning service 150 information identifying the selected enterprise service plan (step 222 of FIG. 2). In response, provisioning service 150 may generate a profile description based on the selected enterprise service plan. Then, provisioning service 150 may send the profile description to the subscription manager 154 (step 224 of FIG. 2). Subscription manager 154 may receive the profile description and, in response, may prepare a profile based on the profile description. After performing procedures for establishing a secure channel for communications with mobile device 122 (step 226 of FIG. 2), the profile may be remotely downloaded to mobile device for installation in the SIM (step 228 of FIG. 2). Thus, the profile may be successfully provisioned and installed in the SIM, and the subscriber may use mobile device 122 for communications.

FIG. 4

Figure 4:
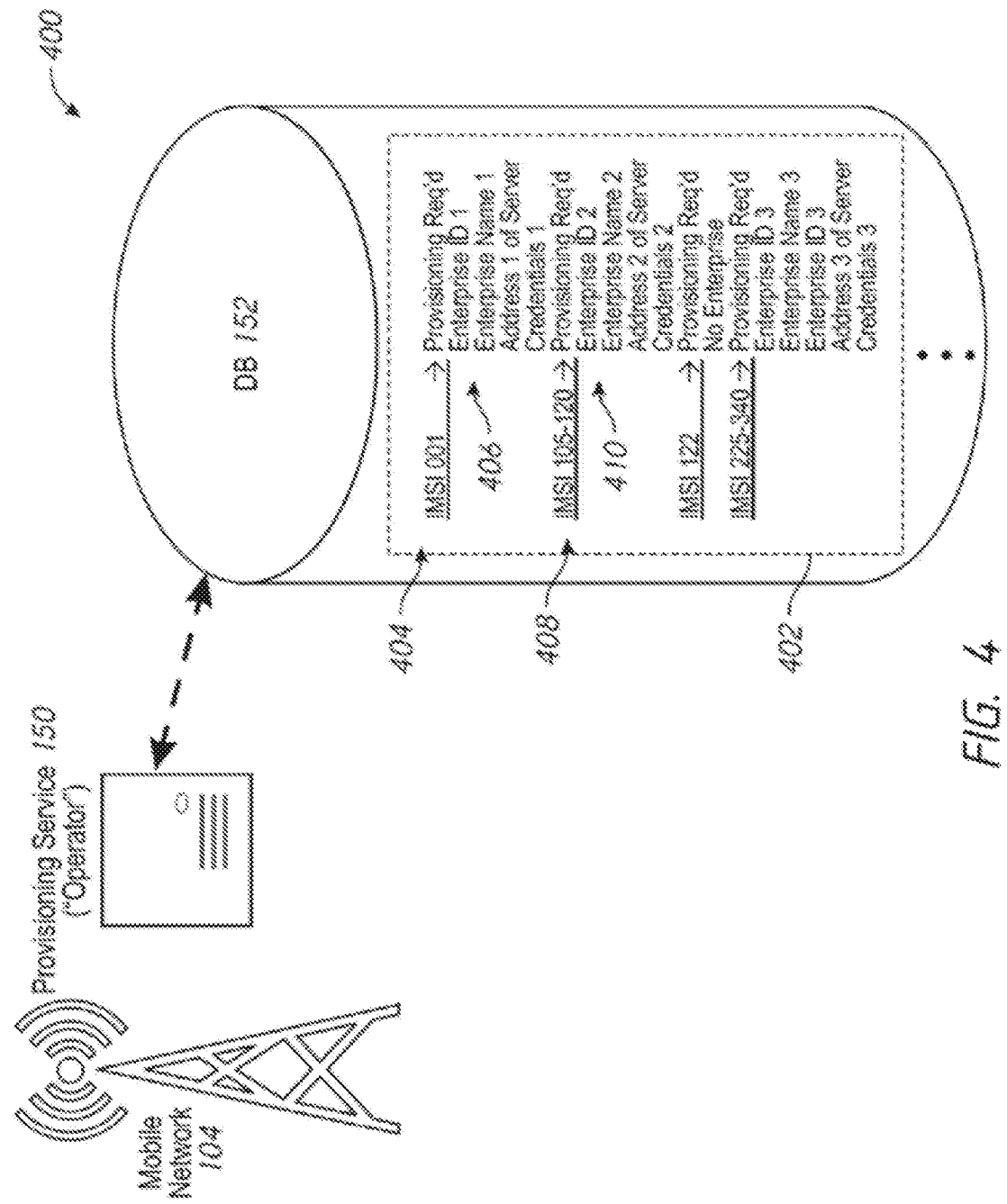
FIG. 4 illustrates a diagram for showing an illustrative example of data items (e.g. data records) and data item relationships which may be maintained in a database (DB) for a provisioning service, according to some aspects of the disclosed technology.

As described earlier in step 204 of FIG. 2, provisioning service 150 accesses its DB 152 to identify whether information associated with the received IMSI from mobile device 122 exists. In FIG. 4, a diagram 400 of an illustrative example of information which may be stored in DB 152 is shown. As illustrated, DB 152 may maintain storage of associations or relationships between a plurality of IMSIs (and/or IMSI ranges), provisioning requirement indications, and enterprise information. More particularly, each IMSI or IMSI range may be associated with a provisioning requirement indication which indicates whether provisioning needs to be performed. If a provisioning indication is identified in association with a received IMSI, then a provisioning procedure is performed; otherwise, if a non-provisioning indication is identified in association with the received IMSI, then no provisioning procedure is performed.

Further in FIG. 4, DB 152 may maintain storage of associations or relationships between the plurality of IMSIs (and/or IMSI ranges) and enterprise information associated with an enterprise. The enterprise information may include one or more data items for identifying or contacting the enterprise. For instance, each IMSI or IMSI range may be associated with an enterprise ID, an enterprise name, an address of a server associated with the enterprise (e.g. enterprise server 172 of FIGS. 1 and 2), credentials for access or authorization associated with the server, or combinations of the above. For example, a data item relationship 404 associates an "IMSI 001" with information 406 indicating that provisioning is required, and that control by an enterprise is necessary, where the enterprise is associated with Enterprise ID 1, Enterprise Name 1, Address 1 of Server, and Credentials 1. Further, a data item relationship 408 associates an IMSI range "IMSI 105-120" with information 410 indicating that provisioning is required, and that control by an enterprise is necessary, where the enterprise is associated with Enterprise ID 2, Enterprise Name 2, Address 2 of Server, and Credentials 2. Other data item relationships are illustrated, including a data item relationship associating "IMSI 122" indicating that no provisioning is required and that no control by an enterprise is necessary; as well as a data item relationship associating an IMSI range "IMSI 225-340" indicating that provisioning is required and that control by an enterprise is necessary, where the enterprise is associated with Enterprise ID 3, Enterprise Name 3, Address 3 of Server, and Credentials 3.

FIG. 5A

Figure 5A:
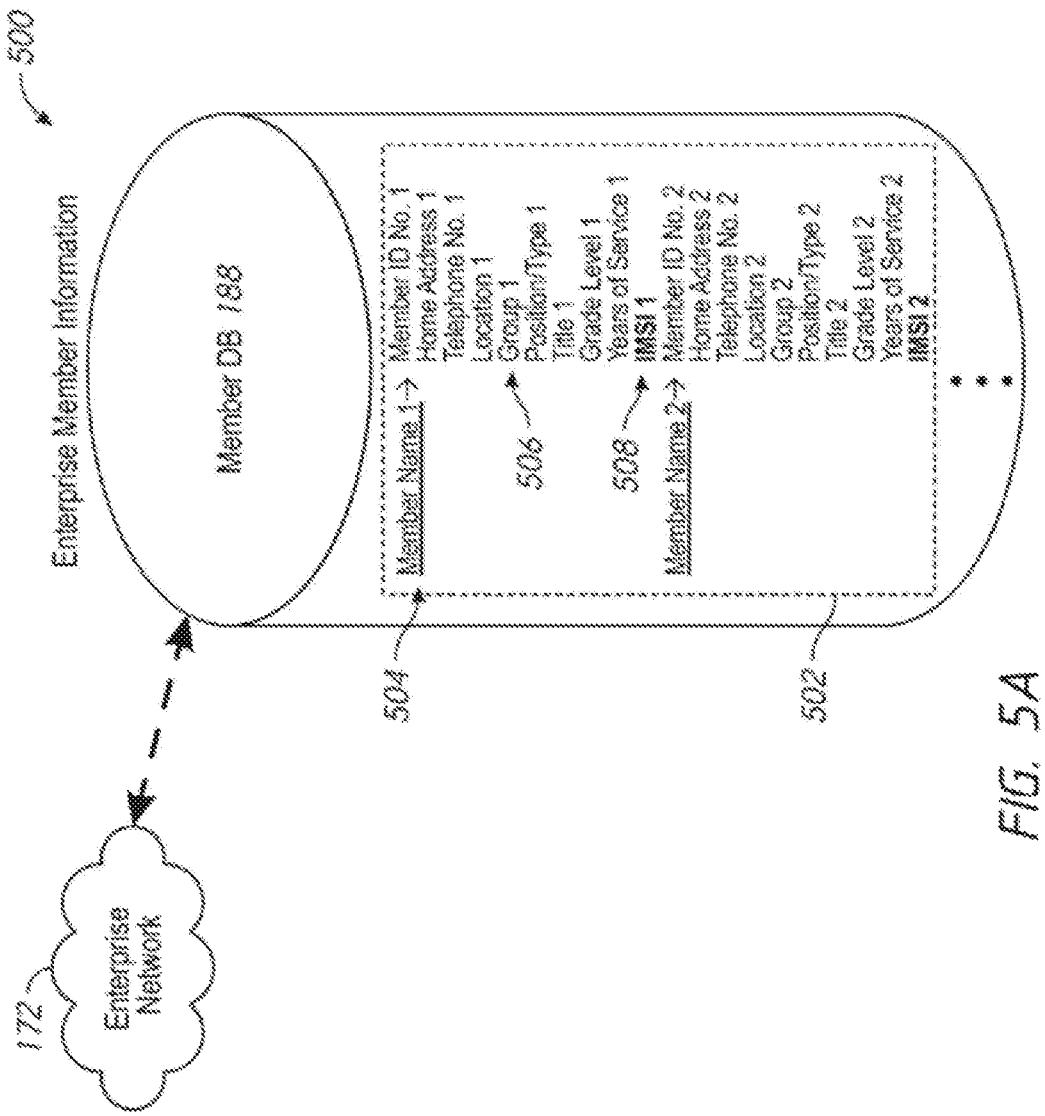
FIG. 5A illustrates a diagram for showing an illustrative example of data items and data item relationships which may be maintained in a member DB for an enterprise and/or enterprise network, according to some aspects of the disclosed technology.

As described earlier in steps 214 and 216 of FIG. 2, enterprise service plan server 156 may access member DB 188 for the selection and receipt of the one or more characteristics of the member or the member's association or relationship with the enterprise. In FIG. 5A, a diagram 500 of an illustrative example of such information 502 which may be stored in member DB 188 is shown. As illustrated, member DB 188 may maintain storage of associations or relationships between data items, including associations or relationships between a plurality of member names and/or IDs and one or more characteristics of the member and/or of the member's association or relationship with the enterprise. For example, a data item relationship 504 associates "Member Name 1" with one or more characteristics 506. The one or more characteristics 506 indicated in FIG. 5A include Member ID No. 1, Home Address, Telephone No. 1, Location 1 (e.g. business location), Group 1 (e.g. business group), Position/Type 1 (e.g. job position or job type), Title 1 (e.g. job title), Grade Level 1 (e.g. level of importance in the business), and Years of Service 1. Also as shown, each member name and/or ID may also be associated with an IMSI, such as data item relationship 504 corresponding to Member Name 1 being associated with data item 508 which is "IMSI 1."

FIG. 5B

Figure 5B:
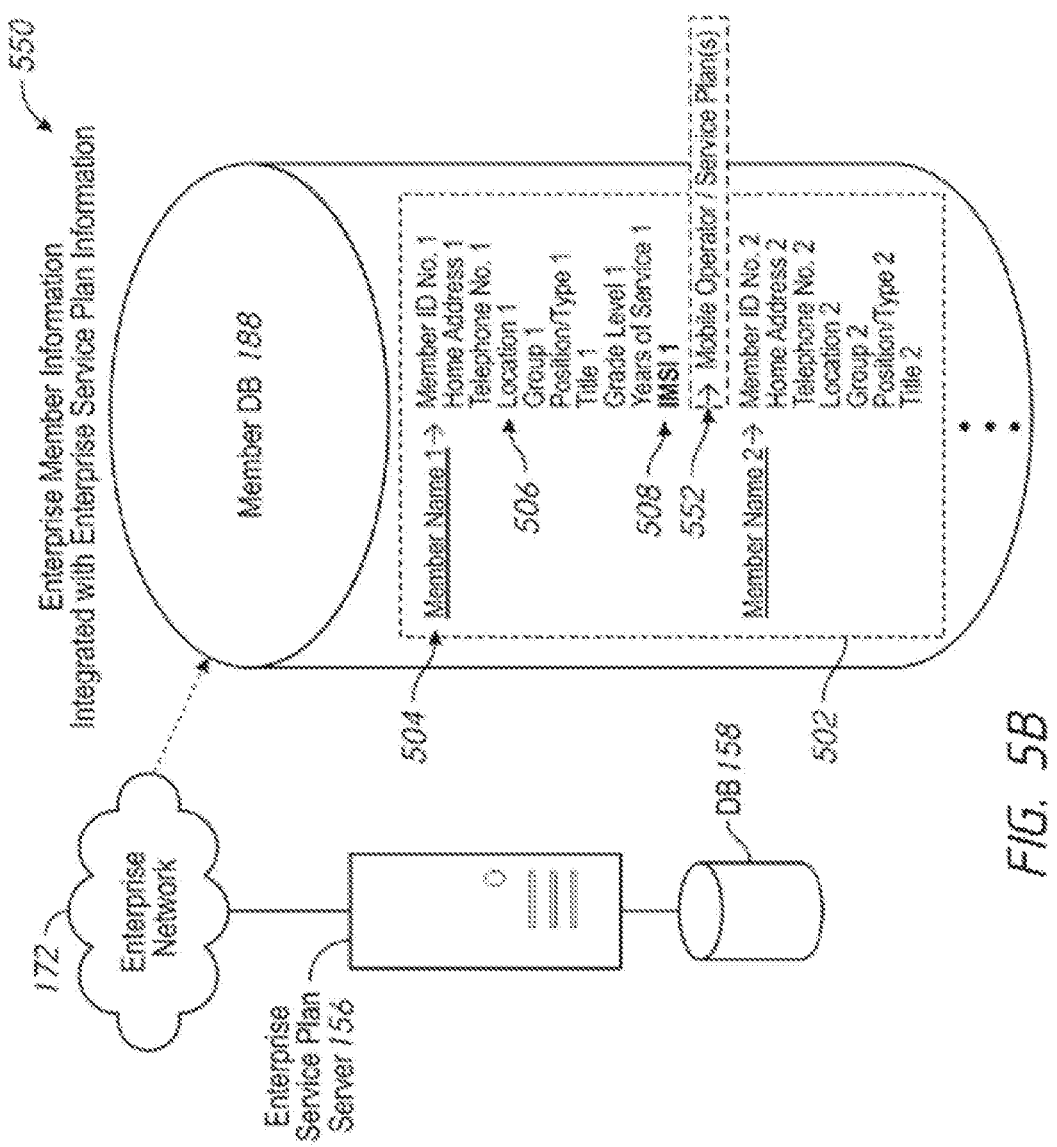
FIG. 5B illustrates a diagram for showing an illustrative example of data items and data item relationships which may be maintained in a member DB for an enterprise and/or enterprise network, together with enterprise service plan information, according to some aspects of the disclosed technology.

Note that, for each member, the one or more enterprise service option plans may alternatively be preselected (i.e. selected prior to mobile device access for provisioning) based on the one or more characteristics of a member. This may be more realizable where enterprise service plan server 156 operates closely in connection with member DB 188 of enterprise network 172. This approach is illustrated in FIG. 5B, where data item relationship 504 corresponding to Member Name 1 is further associated with a data item 552 corresponding to one or more selected mobile operator/service plans.

Figure 6A:
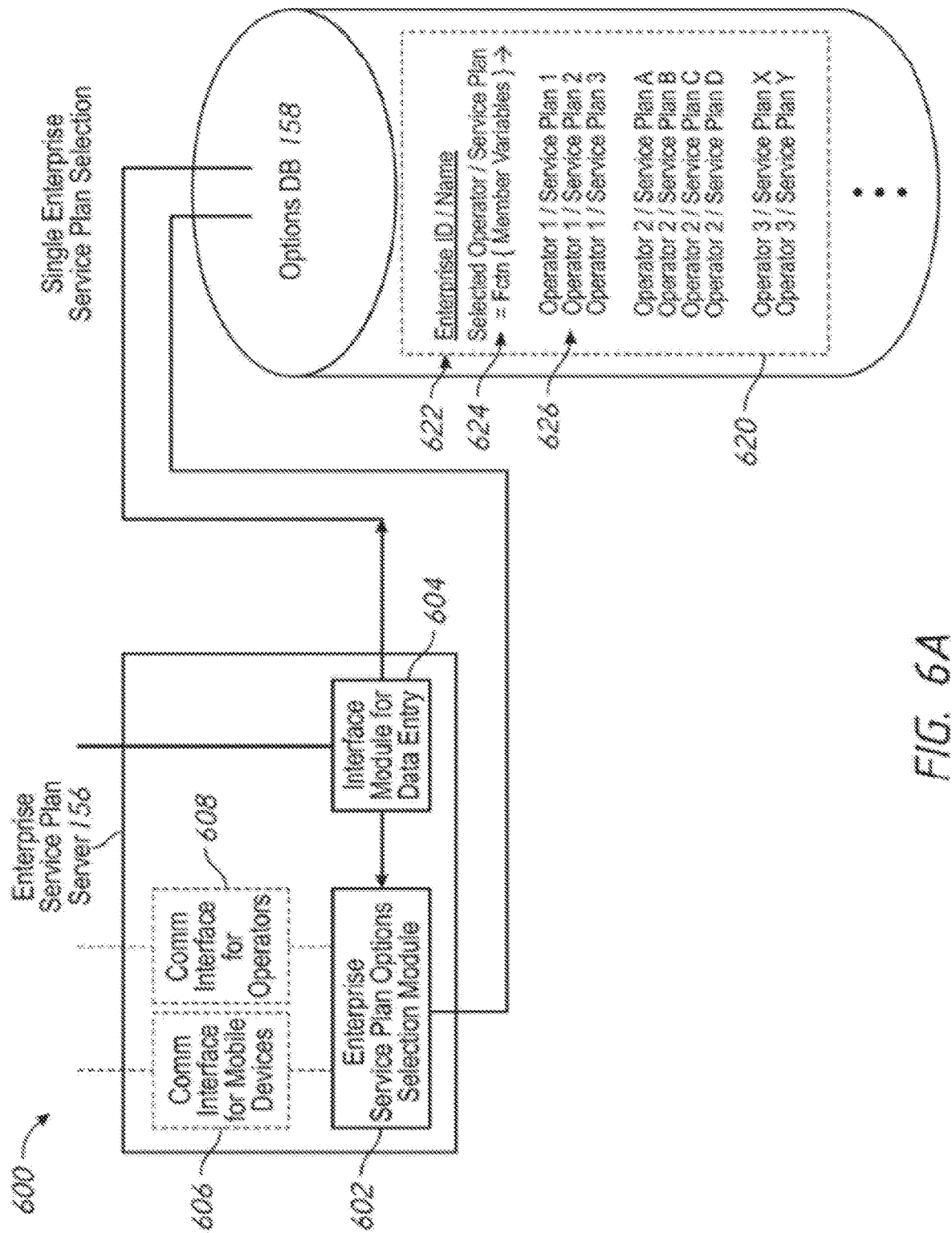
FIGS. 6A and 6B illustrate a block diagram of applicable modules of an enterprise service plan server, together with an illustrative example of data items and data item relationships which may be maintained in a DB for use therewith for a single enterprise (FIG. 6A) as well as one or more enterprises (FIG. 6B), according to some aspects of the disclosed technology.

As described earlier in relation to step 218 of FIG. 2, enterprise service plan server 156 may select one or more enterprise service plan options in options DB 158 based on one or more selected characteristics associated with the member. In FIG. 6A, a block diagram 600 of applicable modules of enterprise service plan server 156 is shown. Enterprise service plan server 156 includes an enterprise service plan options selection module 602 and an interface module for data entry 604. Enterprise service plan options selection module 602 is configured to select one or more enterprise service plan options from options DB 158 as a function of enterprise member variables, such as one or more characteristics of a member and/or of the member's relationship with the enterprise. For interfacing (e.g. communicating) with enterprise service plan options selection module 602, enterprise service plan server 156 may include a communication interface for mobile devices 606 (e.g. methods of FIGS. 2, 7, and 17) or, alternatively, a communication interface for operators 608 (e.g. methods of FIGS. 3, 8, and 18).

Interface module for data entry 604 is configured to provide for the display, entry, and editing of information 620 in options DB 158 and/or for any information (e.g. function, rules, or instructions) locally accessed by enterprise service plan options selection module 602. A graphical user interface (GUI) may be provided for a user (e.g. via terminal 182 of enterprise network 172 or other suitable terminal) for the display, entry, and/or editing of information 620.

FIG. 6A

In FIG. 6A, the applicable modules of enterprise service plan server 156 are shown together with an illustrative example of information 620 in options DB 158. As shown, options DB 158 in FIG. 6A is configured for use with a single enterprise. In this case, enterprise service plan server 156 and options DB 158 may be part of and connected in an enterprise network, such as enterprise network 172 of FIG. 1A. As shown, options DB 158 in FIG. 6A may include a data item 622 indicating the enterprise ID/name of the enterprise, and a plurality of service plan options 626 of the enterprise. One or more enterprise service plan options may be selected from these plurality of service plan options 626 based on a function 624 of enterprise member variables, such as one or more characteristics of a member and/or of the member's relationship with the enterprise. Function 624 may be represented by one or more rules or instructions carried out for selection based on the one or more inputted characteristics. Function 624 may be different for each enterprise, and may be edited or modified via the interface module for data entry 604.

FIG. 6B

Figure 6B:
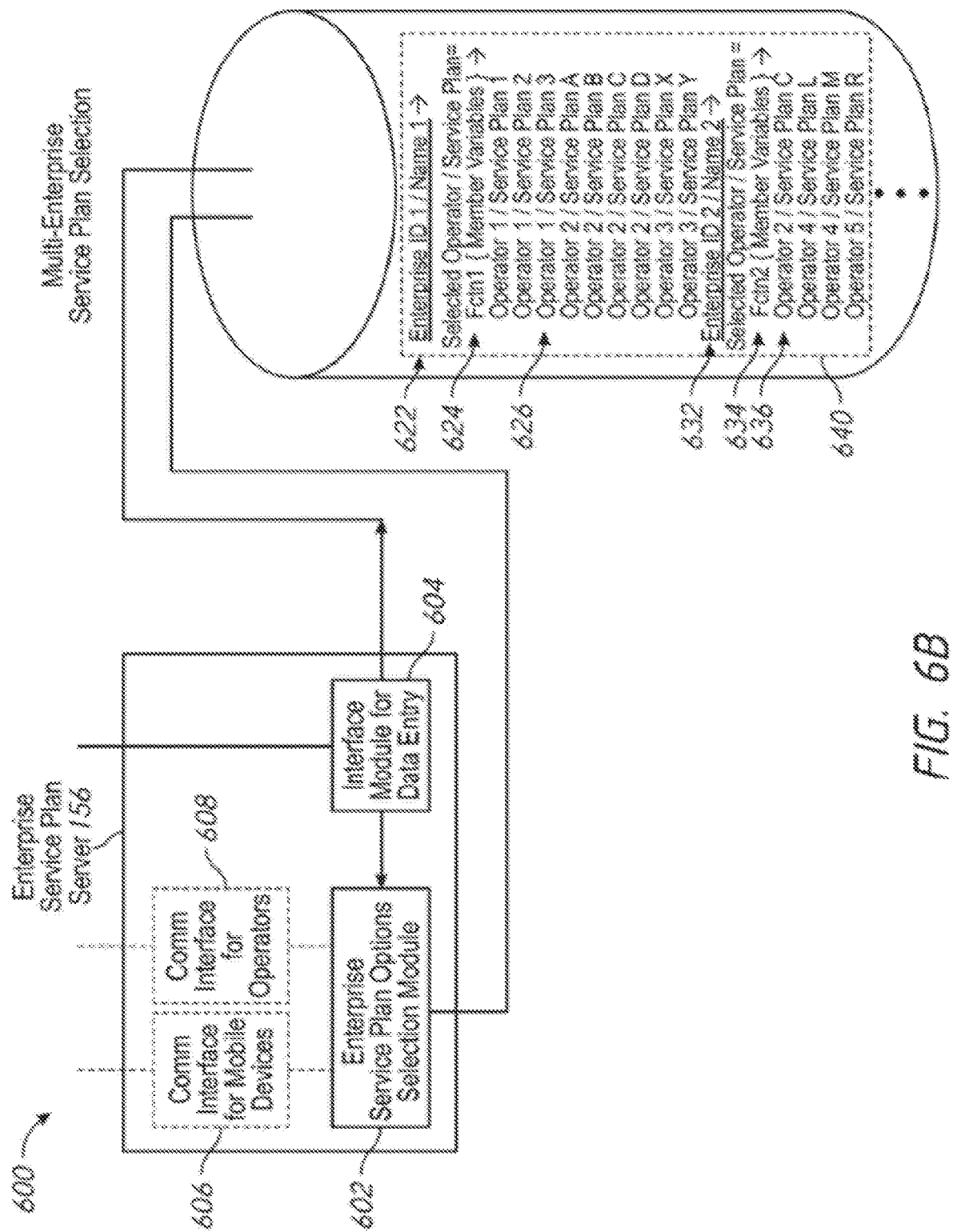

In FIG. 6B, the applicable modules of enterprise service plan server 156 are shown together with another illustrative example of information 640 in options DB 158. As shown, enterprise service plan server 156 and options DB 158 in FIG. 6A are configured for use with a plurality of different enterprises (i.e. multi-tenant or multi-enterprise). In this case, enterprise service plan server 156 and options DB 158 may be connected in a provisioning service or in a core network of a mobile network (e.g. provisioning service 150 or core network 105 of mobile network 104 of FIG. 1A), or alternatively to a network such as the Internet (e.g. network 110 of FIG. 1A).

As shown in FIG. 6B, options DB 158 may include data item 622 indicating an enterprise ID 1/name 1 of enterprise 1, and the plurality of service plan options 626 of enterprise 1 (i.e. similar to that described in relation to FIG. 6B). One or more enterprise service plan options may be selected from these plurality of service plan options 626 based on function 624 of enterprise member variables. Similarly, options DB 158 in FIG. 6B may include a data item 632 indicating the enterprise ID 2/name 2 of an enterprise 2, and the plurality of service plan options 636 of enterprise 2. One or more enterprise service plan options may be selected from these plurality of service plan options 636 based on a function 634 of enterprise member variables. Functions 624 and 634 may each be represented by one or more rules or instructions carried out for selection based on the one or more inputted characteristics. Again, functions 624 and 634 may be different for each enterprise, and may be edited or modified via the interface module for data entry 604. As is apparent, additional data sets for additional enterprises may be provided for in options DB 158 as well.

FIG. 3

Figure 3:
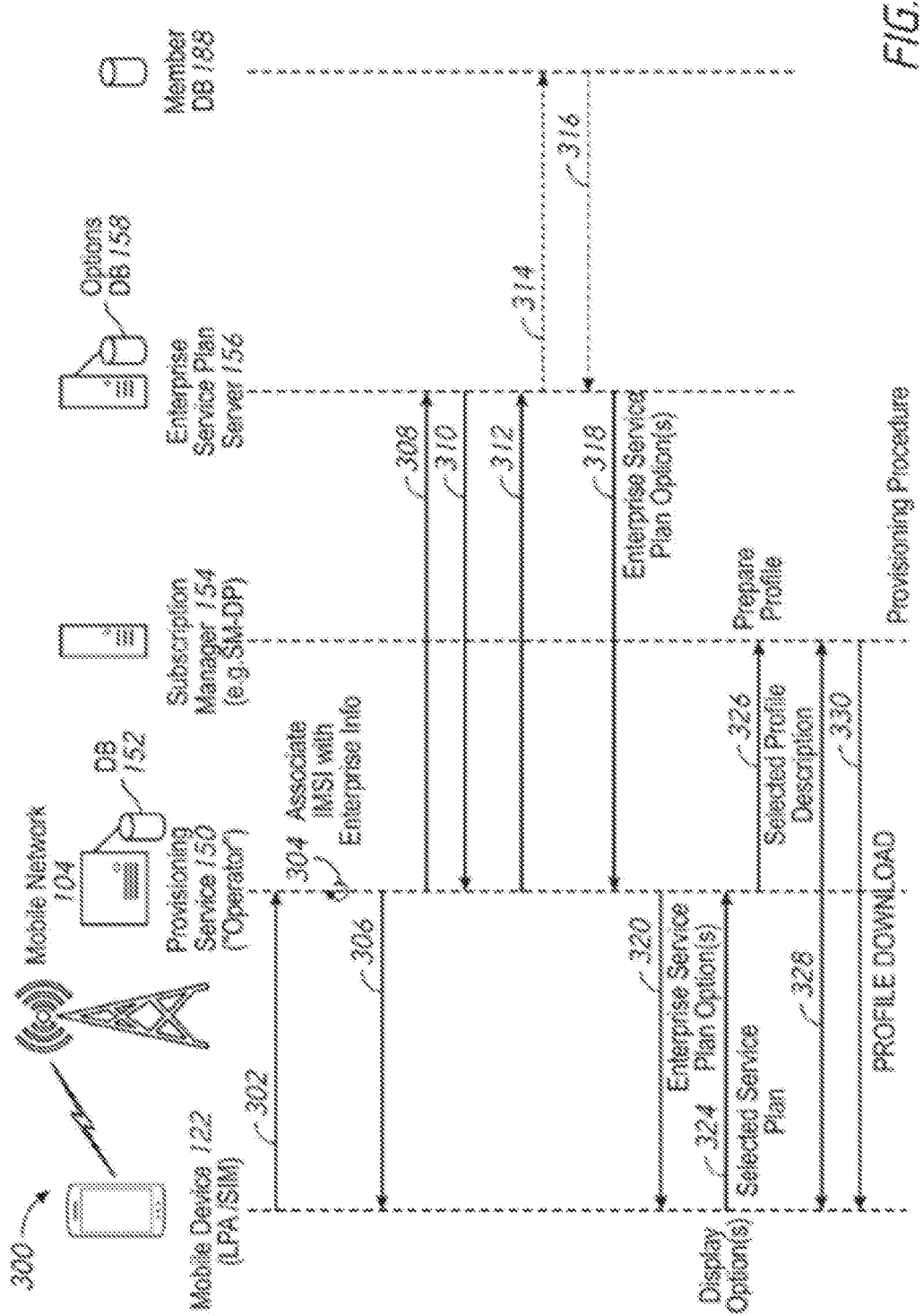

Referring now to FIG. 3, a message flow diagram 300 for describing a method of remotely provisioning a SIM in a communication system (e.g. communication system 100 of FIG. 1A) is shown. In particular, the method of FIG. 3 may be for use in remotely provisioning a SIM for a mobile device (e.g. mobile device 122), where the SIM is associated with (e.g. being owned and/or controlled by) an enterprise (i.e. a business organization) having an enterprise network (e.g. enterprise network 172). Although this description may indicate a specific implementation where mobile device 122 is remotely provisioned via a mobile network of an MNO, the mobile device may be similarly remotely provisioned via any suitable network, including the Internet. Also note that although enterprise service plan server 156 is shown in FIG. 3 in communication with a single mobile network 104 of MNO 1, the server 156 may alternatively be in communication with multiple networks of multiple MNOs (e.g. MNO 1, MNO 2, MNO 3, etc.) as needed.

In the description of FIG. 3, provisioning service 150 (the "operator"), subscription manager 154, enterprise service plan server 156, and/or combinations thereof, may be configured to perform techniques of the present disclosure. In the method of FIG. 3, enterprise service plan server 156 is configured to communicate with provisioning service 150, and provisioning service 150 is configured to communicate with mobile device 122, for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172).

In FIG. 3, in an effort to obtain communication service, a user turns on mobile device 122 which includes a previously-unused SIM. In response, mobile device 122 communicates one or more messages in an attempt to connect with mobile network 104 (step 302 of FIG. 3). Mobile network 104 will serve as a default network for provisioning the mobile device 122. In this step, mobile device 122 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 304 of FIG. 3).

In the present case, smart card 120 and/or mobile device 122 may be owned and/or controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more received data items including Enterprise ID 1, Enterprise Name 1, Address 1 of Server, and Credentials 1. Note that the "Address 1 of Server" may be the address of enterprise service plan server 156, and the Enterprise ID 1 and the Enterprise Name 1 may each identify the enterprise associated with the received IMSI of smart card 120.

In response to identifying the association, provisioning service 150 may cause a message to be sent to mobile device 122 for confirmation/acknowledgment and/or for indicating that provisioning is required (step 306 of FIG. 3). In addition, provisioning service 150 may send one or more messages to enterprise service plan server 156 based on the received enterprise information (step 308 of FIG. 3). The enterprise service plan server 156 may respond to provisioning service 150 and establish a communication session with provisioning service 150 (step 310 of FIG. 3).

Next, provisioning service 150 may send a request to enterprise service plan server 156 (step 312 of FIG. 3). The request may be, for example, a request for enterprise service plan options. In response, enterprise service plan server 156 may access options DB 158 to select one or more enterprise service plan options from a plurality of service plan options in options DB 158. Enterprise service plan server 156 may then send to provisioning service 150 one or more messages which include information identifying the selected one or more enterprise service plan options (step 318 of FIG. 2). Provisioning service 150 may, in turn, send to mobile device 122 one or more messages which include information identifying the selected one or more enterprise service plan options (step 320 of FIG. 2).

Mobile device 122 may receive the information identifying the selected one or more enterprise service plan options from provisioning service 150. The selected one or more enterprise service plan options may be displayed in a user interface (e.g. a visual display, or touch screen display) of mobile device 122. The user of mobile device may select one of the one or more enterprise service plan options via the user interface. In response to the selection, mobile device 122 may send to provisioning service 150 the information identifying the user's selected enterprise service plan (step 324 of FIG. 3).

In some implementations, enterprise service plan server 156 may select the one or more enterprise service plan options based on the IMSI or other identifier received from mobile device 122. In addition, or alternatively, enterprise service plan server 156 may select the one or more enterprise service plan options based on one or more characteristics of the member (i.e. the user of mobile device 122) and/or of the member's association or relationship with the enterprise. Thus, the one or more enterprise service plan options may be selected as a function of member variables (e.g. one or more characteristics of the member, or of the member's association or relationship with the enterprise). The one or more characteristics may be received from mobile device 122 or through an alternative (e.g. out-of-band) channel.

In other implementations, enterprise service plan server 156 may access member DB 188 for the selection and receipt of the one or more characteristics of the member or the member's association or relationship with the enterprise (see steps 314 and 316 of FIG. 3). These one or more selected characteristics may be used in the selection of the one or more enterprise service plan options from options DB 158. Here, enterprise service plan server 156 may select the one or more characteristics of the member from member DB 188 based on, for example, a member name or member ID of the member of the enterprise (i.e. the user of mobile device 122). The member name or member ID may be received from mobile device 122 or through an alternative (e.g. out-of-band) channel.

Note that, when accessing its options DB 158, enterprise service plan server 156 may identify only a single enterprise service plan option from options DB 158. Here, enterprise service plan server 156 may still send information identifying the single enterprise service plan option for display at mobile device 122, where the user merely provides a confirmation of the selected enterprise service plan option. Alternatively, enterprise service plan server 156 may refrain from sending the information to mobile device in step 320, and proceed directly to step 326 of FIG. 3, thereby automatically performing the selection on behalf of mobile device 122.

In some implementations, the one or more characteristics used to select the one or more enterprise service plan options may additionally or alternatively include one or more characteristics or indicators indicative of intended contextual use, such as any one or more of a location or geography indicator (e.g. based on GPS coordinates or IP address), a language indicator, a device capability indicator such as a voice and/or data communication capability indicator, etc., indicators that may be received via user input or from the device itself and/or its applications.

After receipt of the information identifying the user's selected enterprise service plan in step 324, provisioning service 150 may generate a profile description based on the selected enterprise service plan. Then, provisioning service 150 may send the profile description to the subscription manager 154 (step 326 of FIG. 3). Subscription manager 154 may receive the profile description and, in response, may prepare or generate a profile based on the received profile description. After performing procedures for establishing a secure channel for communications with mobile device 122 (step 328 of FIG. 3), the profile may be remotely downloaded to mobile device for installation in the SIM (step 330 of FIG. 2). Thus, the profile may be successfully provisioned and installed in the SIM, and the subscriber may use mobile device 122 for communications.

Note that the description associated with FIGS. 4, 5(*a*) and 5(*b*), and 6(*a*) and 6(*b*), as previously described in relation to the method of FIG. 2, applies to the method of FIG. 3 as well.

FIG. 7

Figure 7:
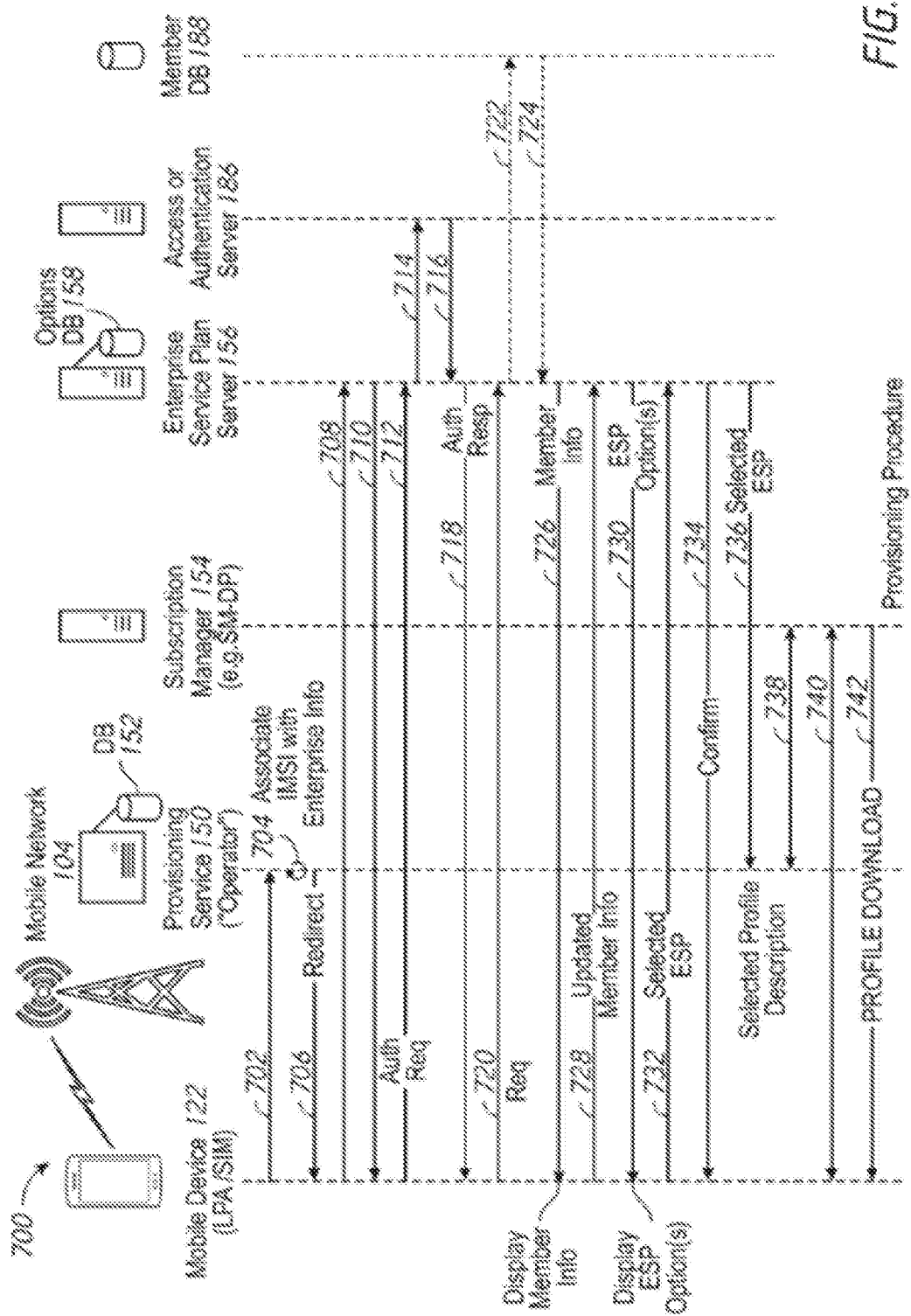
FIGS. 7 and 8 illustrate message flow diagrams for describing methods for use in provisioning a SIM associated with an enterprise, according to some aspects of the disclosed technology.

FIG. 7 is a message flow diagram 700 for describing a method of remotely provisioning a SIM in a communication system (e.g. communication system 100 of FIG. 1A). In particular, the method of FIG. 7 may be for use in remotely provisioning a SIM for a mobile device (e.g. mobile device 122), where the SIM is associated with (e.g. being owned and/or controlled by) an enterprise (i.e. a business organization) having an enterprise network (e.g. enterprise network 172). Note that the method of FIG. 7 is a more specific implementation than the method described previously in relation to FIG. 2. Although this description may indicate a specific implementation where mobile device 122 is remotely provisioned via a mobile network of an MNO, the mobile device may be similarly remotely provisioned via any suitable network, including the Internet. Also note that although enterprise service plan server 156 is shown in FIG. 7 in communication with a single mobile network 104 of MNO 1, the server 156 may alternatively be in communication with multiple networks of multiple MNOs (e.g. MNO 1, MNO 2, MNO 3, etc.) as needed.

In the description of FIG. 7, provisioning service 150 (the "operator"), subscription manager 154, enterprise service plan server 156, and/or combinations thereof, may be configured to perform techniques of the present disclosure. Also in FIG. 7, enterprise service plan server 156 is configured to communicate with mobile device 122 for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172). Note that, in the remaining description and drawings, enterprise service plan may be abbreviated as "ESP."

In an effort to obtain communication service, a user turns on mobile device 122 which includes a previously-unused SIM. In response, mobile device 122 communicates one or more messages in an attempt to connect with mobile network 104 (step 702 of FIG. 7). Mobile network 104 will serve as a default network for provisioning the mobile device 122. In this step, mobile device 122 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 704 of FIG. 2).

In the present case, smart card 120 and/or mobile device 122 may be owned and/or controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more data items including Enterprise ID 1, Enterprise Name 1, Address 1 of Server, and Credentials 1.

In response to identifying the association, provisioning service 150 causes a message to be sent to mobile device 122 for redirecting the mobile device 122 (step 706 of FIG. 7). Specifically, the message may redirect the mobile device 122 to enterprise service plan server 156. For example, in step 206, provisioning service 150 may cause one or more data items, such as Enterprise ID 1, Enterprise Name 1, Address 1 of Server, Credentials 1, or any combination of the above, to be sent to mobile device 122. Note that the "Address 1 of Server" may be the address of enterprise service plan server 156, and the Enterprise ID 1 and the Enterprise Name 1 may identify the enterprise associated with the received IMSI of smart card 120. In response to receiving the message, mobile device 122 may be redirected to enterprise service plan server 156, and send one or more messages to enterprise service plan server 156, based on the received data items (step 708 of FIG. 7). The enterprise service plan server 156 may respond to mobile device 122 (step 710 of FIG. 7) to establish a communication session with mobile device 122.

Next, mobile device 122 may send a request to enterprise service plan server 156 (step 712 of FIG. 7). The request may be, for example, a request for authentication (e.g. authentication based on (e.g. enterprise) login credentials or other suitable challenge/response procedure). The request for authentication may include authentication information of the user. For example, the authentication information may be authentication information for access to information associated with the enterprise of the user. In response, enterprise service plan server 156 may send to authentication server 186 the request for authentication with the authentication information (step 714 of FIG. 7), and then receive an authentication response from the authentication server 186 (step 716 of FIG. 7). If the authentication is successful as indicated in the response, enterprise service plan server may send to mobile device 122 a response indicating that the authentication is successful (step 718 of FIG. 7). Note that these authentication steps 714 and 716 may alternatively be performed directly by mobile device 122.

Next, mobile device 122 may send another request to enterprise service plan server 156 (step 720 of FIG. 7). This request may be, for example, a request for member information of the member (i.e. the user of mobile device 122). The member information may include one or more characteristics of the member or of the member's association or relationship with the enterprise. In particular, enterprise service plan server 156 may access member DB 188 for the selection and receipt of the member information (see steps 722 and 724 of FIG. 7). Here, enterprise service plan server 156 may select the member information from member DB 188 based on, for example, a member name or member ID of the member of the enterprise (i.e. the user of mobile device 122) and/or the previous authentication information. The member name or member ID may be received from mobile device 122, or through an alternative (e.g. out-of-band) channel. Enterprise service plan server 156 may then send one or more messages to mobile device 122 in response to the request, where the one or more messages include the received member information (step 726 of FIG. 7).

Mobile device 122 may receive the member information including the one or more characteristics of the member and/or of the member's association or relationship with the enterprise. Note that an authentication procedure with the enterprise or network may precede the receipt of the member information. The member information may be displayed in a user interface (e.g. a visual display, or touch screen display) of mobile device 122. (See e.g. the illustrative examples of member information displayed in a user interface of mobile device 122 in FIGS. 9, 11, 13, and 15, which are described later below in detail.) The user of mobile device 122 may be able to confirm, edit, or add to any one of the one or more characteristics of the member information via the user interface. On the other hand, some or all of the member information may be "read-only" information, where the user may only be able to confirm the accuracy of the data item(s). In response to a user confirmation of the member information, mobile device 122 may send to enterprise service plan server 156 the confirmed, edited, and/or added to (updated) member information of the member (step 728 of FIG. 7).

Enterprise service plan server 156 may receive the member information from mobile device 122. Thereafter, enterprise service plan server 156 may use the received member information to select one or more enterprise service plan options for the user. More particularly, enterprise service plan server 156 may select the one or more enterprise service plan options in options DB 158 based on the one or more received characteristics of the member information. Enterprise service plan server 156 may then send one or more messages to mobile device 122 in response to the request, where the one or more messages include information identifying the selected one or more enterprise service plan options (step 730 of FIG. 2).

In some implementations, the one or more characteristics used to select the one or more enterprise service plan options may additionally or alternatively include those characteristics or indicators indicative of intended contextual use, such as any one or more of a location or geography indicator (e.g. based on GPS coordinates or IP address), a language indicator, a device capability indicator such as a voice and/or data communication capability indicator, etc., indicators that may be received via user input or from the device itself and/or its applications.

Mobile device 122 may receive the information identifying the selected one or more enterprise service plan options from enterprise server. The selected one or more enterprise service plan options may be displayed in the user interface (e.g. a visual display, or touch screen display) of mobile device 122. (See e.g. the illustrative examples of selected one or more enterprise service plan options displayed in a user interface of mobile device 122 in FIGS. 10, 12, 14, and 16, which are described later below in detail.) The user of mobile device may select one of the one or more enterprise service plan options via the user interface. In response to the selection, mobile device 122 may send to enterprise service plan server 156 the information identifying the user's selected enterprise service plan (step 732 of FIG. 7). This selection may be confirmed by enterprise service plan server 156 which sends a confirmation message to mobile device 122 (step 734 of FIG. 7).

Note that, when accessing its options DB 158, enterprise service plan server 156 may identify only a single enterprise service plan option from options DB 158. Here, enterprise service plan server 156 may still send information identifying the single enterprise service plan option for display at mobile device 122, where the user merely provides a confirmation of the selected enterprise service plan option. Alternatively, enterprise service plan server 156 may refrain from sending the information to mobile device in step 730, and proceed directly to step 734 or 736 of FIG. 7, thereby automatically performing the selection on behalf of mobile device 122.

After receipt of the information identifying the user's selected enterprise service plan in step 732, enterprise service plan server 156 may send to provisioning service 150 information identifying the selected enterprise service plan (step 736 of FIG. 7). In response, provisioning service 150 may generate a profile description based on the selected enterprise service plan. Then, provisioning service 150 may send the profile description to the subscription manager 154

(step 738 of FIG. 7). Subscription manager 154 may receive the profile description and, in response, may prepare a profile based on the profile description. After performing procedures for establishing a secure channel for communications with mobile device 122 (step 740 of FIG. 7), the profile may be remotely downloaded to mobile device for installation in the SIM (step 742 of FIG. 7). Thus, the profile may be successfully provisioned and installed in the SIM, and the subscriber may use mobile device 122 for communications.

Note that the description associated with FIGS. 4, 5(*a*) and 5(*b*), and 6(*a*) and 6(*b*), as previously described in relation to the method of FIG. 2, applies to the method of FIG. 7 as well.

FIG. 8

Figure 8:
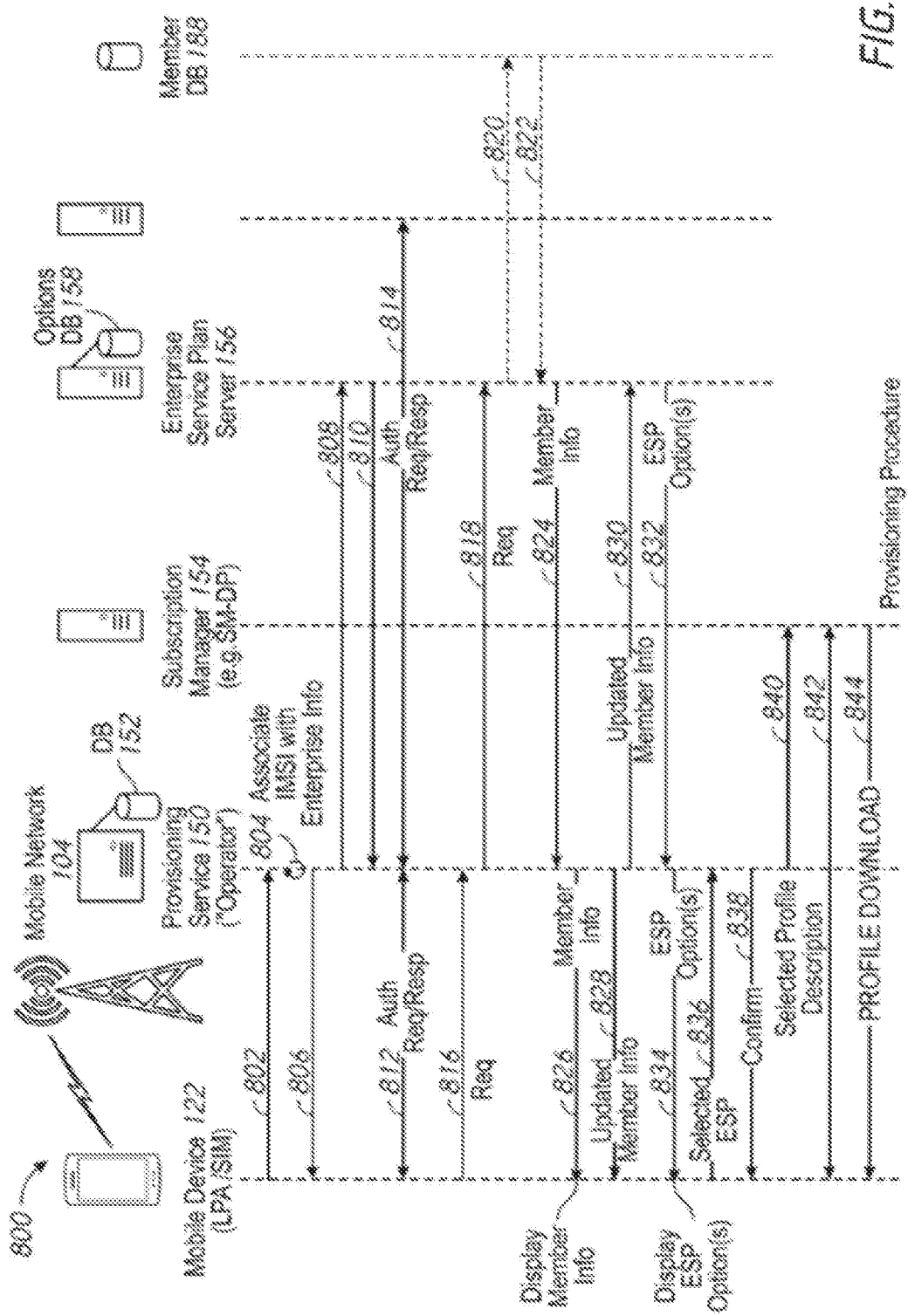

Referring now to FIG. 8, a message flow diagram 800 for describing a method of remotely provisioning a SIM in a communication system (e.g. communication system 100 of FIG. 1A) is shown. In particular, the method of FIG. 8 may be for use in remotely provisioning a SIM for a mobile device (e.g. mobile device 122), where the SIM is associated with (e.g. being owned and/or controlled by) an enterprise (i.e. a business organization) having an enterprise network (e.g. enterprise network 172). Although this description may indicate a specific implementation where mobile device 122 is remotely provisioned via a mobile network of an MNO, the mobile device may be similarly remotely provisioned via any suitable network, including the Internet. Also note that although enterprise service plan server 156 is shown in FIG. 8 in communication with a single mobile network 104 of MNO 1, the server 156 may alternatively be in communication with multiple networks of multiple MNOs (e.g. MNO 1, MNO 2, MNO 3, etc.) as needed.

In the description of FIG. 8, provisioning service 150 (the "operator"), subscription manager 154, enterprise service plan server 156, and/or combinations thereof, may be configured to perform techniques of the present disclosure. Also in FIG. 8, enterprise service plan server 156 is configured to communicate with provisioning service 150, and provisioning service 150 is configured to communicate with mobile device 122, for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172).

In an effort to obtain communication service, a user turns on mobile device 122 which includes a previously-unused SIM. In response, mobile device 122 communicates one or more messages in an attempt to connect with mobile network 104 (step 802 of FIG. 8). Mobile network 104 will serve as a default network for provisioning the mobile device 122. In this step, mobile device 122 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 804 of FIG. 8).

In the present case, smart card 120 and/or mobile device 122 may be owned and/controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more data items including Enterprise ID 1, Enterprise Name 1, Address 1 of Server, and Credentials 1.

In response to identifying the association, provisioning service 150 may cause a message to be sent to mobile device 122 for confirmation/acknowledgment and/or for indicating that provisioning is required (step 806 of FIG. 8). In addition, provisioning service 150 may send one or more messages to enterprise service plan server 156 in accordance with the received enterprise information (step 808 of FIG. 8). The enterprise service plan server 156 may respond to provisioning service 150 and establish a communication session with provisioning service 150 (step 810 of FIG. 8).

Next, mobile device 122 may send a request to provisioning service 150. The request may be, for example, a request for authentication (e.g. authentication based on (e.g. enterprise) login credentials or other suitable challenge/response procedure). The request for authentication may include authentication information of the user. For example, the authentication information may be authentication information for member access to information associated with the enterprise of the user. These authentication steps, which include steps 812 and 814 of FIG. 8, may be same as that described previously in relation to FIG. 7, or similar where provisioning service 150 serves as an intermediary, or other suitable variation. If the authentication is successful, enterprise service plan server may send to mobile device 122 a response indicating that the authentication is successful.

Next, mobile device 122 may send another request to provisioning service 150 (step 816 of FIG. 8). This request may be, for example, a request for member information of the member (i.e. the user of mobile device 122). The request is received at provisioning service 150, which passes a corresponding request to enterprise service plan server 156 (step 818 of FIG. 8). In response to receiving the request, enterprise service plan server 156 may access member DB 188 for the selection and receipt of the member information (see steps 820 and 822 of FIG. 8). The member information may include one or more characteristics of the member or of the member's association or relationship with the enterprise. Here, enterprise service plan server 156 may select the member information from member DB 188 based on, for example, a member name or member ID of the member of the enterprise (i.e. the user of mobile device 122) and/or the previous authentication information. The member name or member ID may be received from mobile device 122, or through an alternative (e.g. out-of-band) channel. Enterprise service plan server 156 may then send one or more messages to provisioning service 150 in response to the request, where the one or more messages include the received member information (step 824 of FIG. 8). The one or more messages are received at provisioning service 150, which passes corresponding messages with the received member information to enterprise service plan server 156 (step 826 of FIG. 8).

Mobile device 122 may receive the member information including the one or more characteristics of the member and/or of the member's association or relationship with the enterprise. The member information may be displayed in a user interface (e.g. a visual display, or touch screen display) of mobile device 122. (See e.g. the illustrative examples of member information displayed in a user interface of mobile device 122 in FIGS. 9, 11, 13, and 15, which are described later below in detail.) The user of mobile device 122 may be able to confirm, edit, or add to any one of the one or more characteristics of the member information via the user interface. On the other hand, some or all of the member information may be "read-only" information, where the user may only be able to confirm the accuracy of the data item(s). In response to a user confirmation of the member information, mobile device 122 may send to provisioning service 150 the confirmed, edited, and/or added to (updated) member information of the member (step 828 of FIG. 8). The member information from mobile device 122 is received at provisioning service 150, which passes it to enterprise service plan server 156 (step 830 of FIG. 8).

Enterprise service plan server 156 may receive the member information from mobile device 122. Thereafter, enterprise service plan server 156 may use the received member information to select one or more enterprise service plan options for the user. More particularly, enterprise service plan server 156 may select the one or more enterprise service plan options in options DB 158 based on the one or more received characteristics of the member information. Enterprise service plan server 156 may then send to provisioning service 150 one or more messages which include information identifying the selected one or more enterprise service plan options (step 832 of FIG. 8). The one or more messages with the options are received at provisioning service 150, which passes them to mobile device 122 (step 834 of FIG. 8).

Mobile device 122 may receive the information identifying the selected one or more enterprise service plan options from enterprise server. The selected one or more enterprise service plan options may be displayed in the user interface (e.g. a visual display, or touch screen display) of mobile device 122. (See e.g. the illustrative examples of selected one or more enterprise service plan options displayed in a user interface of mobile device 122 in FIGS. 10, 12, 14, and 16, which are described later below in detail.) The user of mobile device may select one of the one or more enterprise service plan options via the user interface. In response to the selection, mobile device 122 may send to provisioning service 150 the information identifying the user's selected enterprise service plan (step 836 of FIG. 8). This selection may be confirmed by provisioning service 150, which sends a confirmation message to mobile device 122 (step 838 of FIG. 8).

Note that, when accessing its options DB 158, enterprise service plan server 156 may identify only a single enterprise service plan option from options DB 158. Here, enterprise service plan server 156 may still send information identifying the single enterprise service plan option for display at mobile device 122, where the user merely provides a confirmation of the selected enterprise service plan option. Alternatively, provisioning service 150 may refrain from sending the information to mobile device in steps 834, and proceed directly to step 838 or 840 of FIG. 8, thereby automatically performing the selection on behalf of mobile device 122.

After receipt of the information identifying the user's selected enterprise service plan in step 836, and/or sending the confirmation message in step 838, provisioning service 150 may generate a profile description based on the selected enterprise service plan. Then, provisioning service 150 may send the profile description to the subscription manager 154 (step 840 of FIG. 8). Subscription manager 154 may receive the profile description and, in response, may prepare a profile based on the profile description. After performing procedures for establishing a secure channel for communications with mobile device 122 (step 842 of FIG. 8), the profile may be remotely downloaded to mobile device for installation in the SIM (step 844 of FIG. 8). Thus, the profile may be successfully provisioned and installed in the SIM, and the subscriber may use mobile device 122 for communications.

Note that the description associated with FIGS. 4, 5(*a*) and 5(*b*), and 6(*a*) and 6(*b*), as previously described in relation to the method of FIG. 2, applies to the method of FIG. 8 as well.

Figure 10:
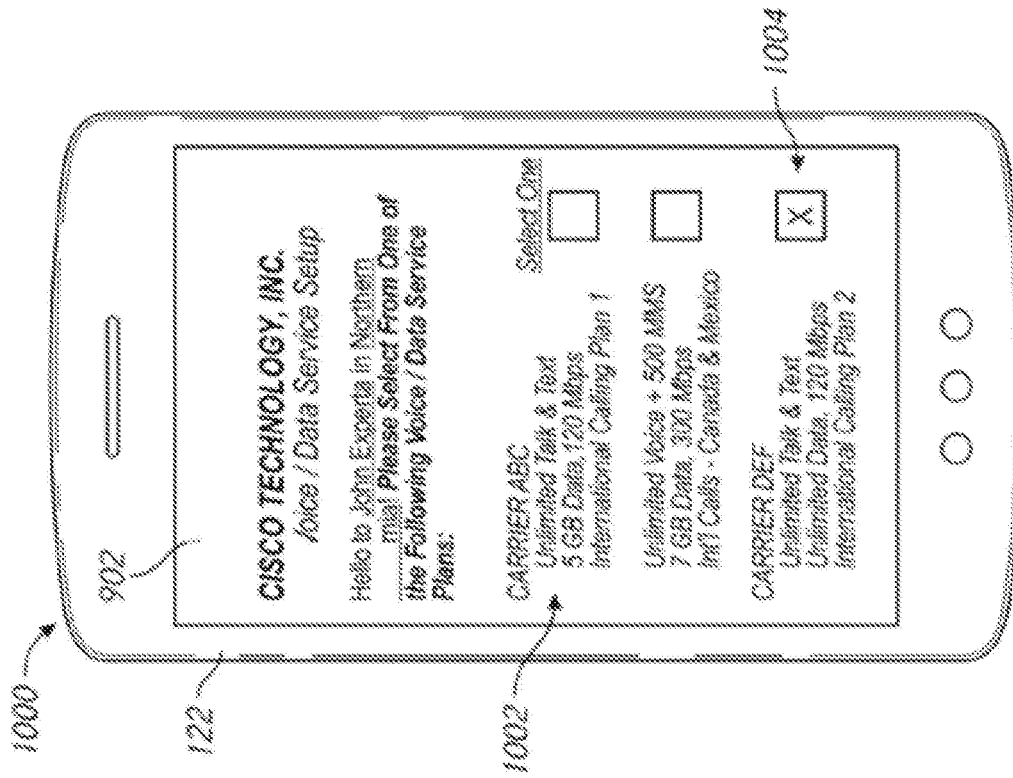
FIGS. 9 and 10 illustrate a pair of illustrations of a user interface of a mobile device showing an illustrative example of information which may be conveyed using the techniques described herein, where
Figure 9:
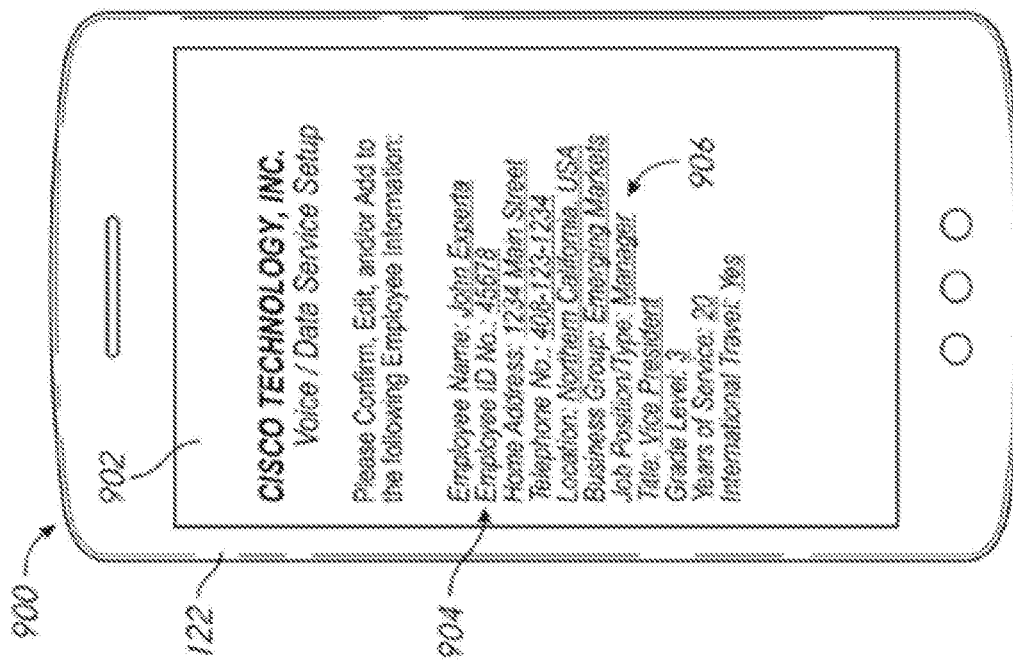

FIGS. 9 and 10

FIGS. 9 and 10 are a pair of illustrative diagrams 900 and 1000, respectively, of a user interface (e.g. a visual or touch screen display 902) of a mobile device (e.g. mobile device 122), showing an illustrative example of information which may be conveyed using the techniques described herein. More particularly, FIG. 9 shows an illustrative example of member information 904 of a member (e.g. an employee named "John Experta") of an enterprise (e.g. a company named "Cisco Technology, Inc."), whereas FIG. 10 shows an illustrative example of a plurality of enterprise service plan options 1002 which are selected and displayed based on member information 904 of FIG. 9. As shown, member information 904 of FIG. 9 may include one or more characteristics of the member and/or of the member's association or relationship with the enterprise, which are displayed in data fields 906. Some or all of data fields 906 of FIG. 9 may be input data fields for editing or adding to by the user of mobile device 122. In FIG. 10, the user may select one of the enterprise service plan options 1002 with use of input/selection fields 1004. Note that member information 904 of FIG. 9 may be provided for display in between steps 726 and 728 of the method of FIG. 7, and in between steps 826 and 828 of the method of FIG. 8, whereas enterprise service plan options 1002 of FIG. 10 may be provided for display in between steps 730 and 732 of the method of FIG. 7, and in between steps 834 and 836 of the method of FIG. 8.

Figure 12:
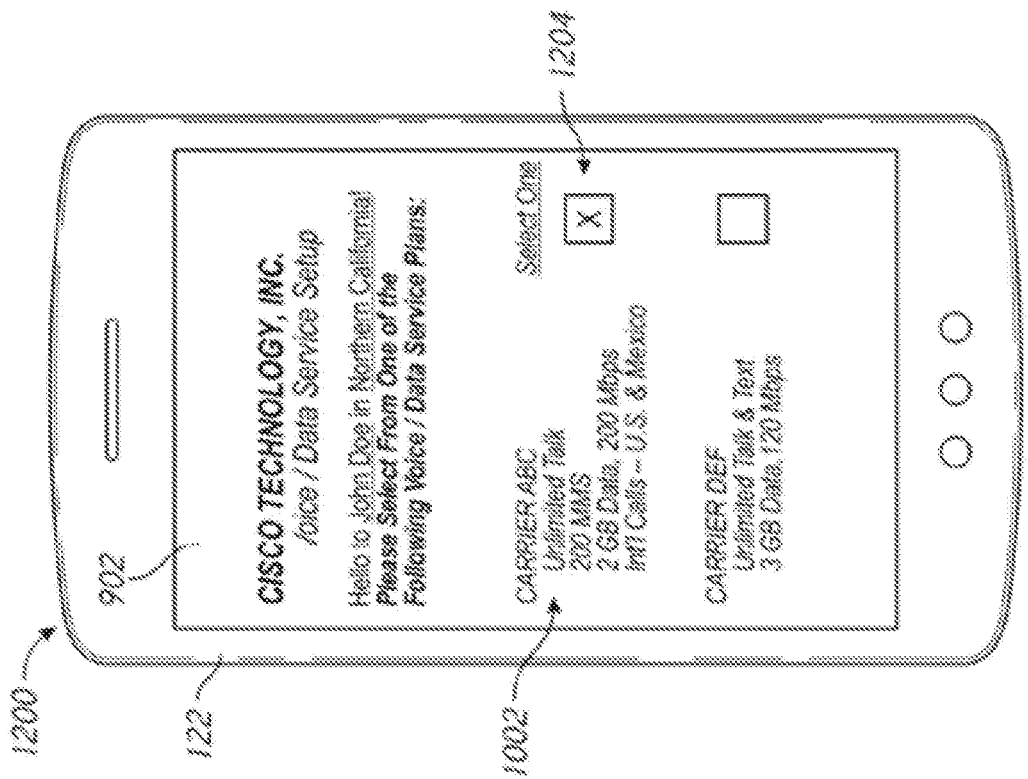
FIGS. 11 and 12 illustrate another pair of illustrations of the user interface of the mobile device like FIGS. 9 and 10, showing another illustrative example of information which may be conveyed using the techniques described herein, according to some aspects of the disclosed technology.
Figure 11:
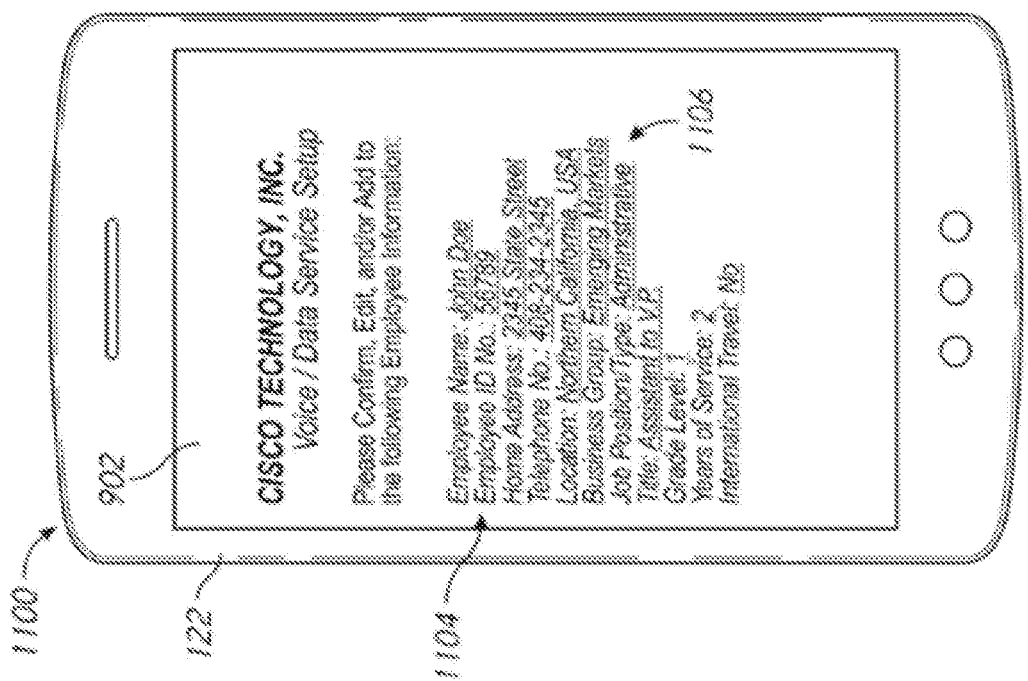

FIGS. 11 and 12

FIGS. 11 and 12 are a pair of illustrative diagrams 1100 and 1200, respectively, of the user interface of mobile device 122, showing another illustrative example of information which may be conveyed using the techniques described herein. More particularly, FIG. 11 shows an illustrative example of member information 1104 of another member (e.g. an employee named "John Doe") of the enterprise (e.g. the company named "Cisco Technology, Inc."), whereas FIG. 10 shows an illustrative example of a plurality of enterprise service plan options 1202 which are selected and displayed based on member information 1104 of FIG. 11. As shown, member information 1104 of FIG. 11 may include one or more characteristics of the member and/or of the member's association or relationship with the enterprise, which are displayed in data fields 1106. Some or all of data fields 1106 of FIG. 11 may be input data fields for editing or adding to by the user of mobile device 122. In FIG. 12, the user may select one of the enterprise service plan options 1202 with use of input/selection fields 1204. Note again that member information 904 of FIG. 11 may be provided for display in between steps 726 and 728 of the method of FIG. 7, and in between steps 826 and 828 of the method of FIG. 8, whereas enterprise service plan options 1002 of FIG. 12 may be provided for display in between steps 730 and 732 of the method of FIG. 7, and in between steps 834 and 836 of the method of FIG. 8.

Figure 14:
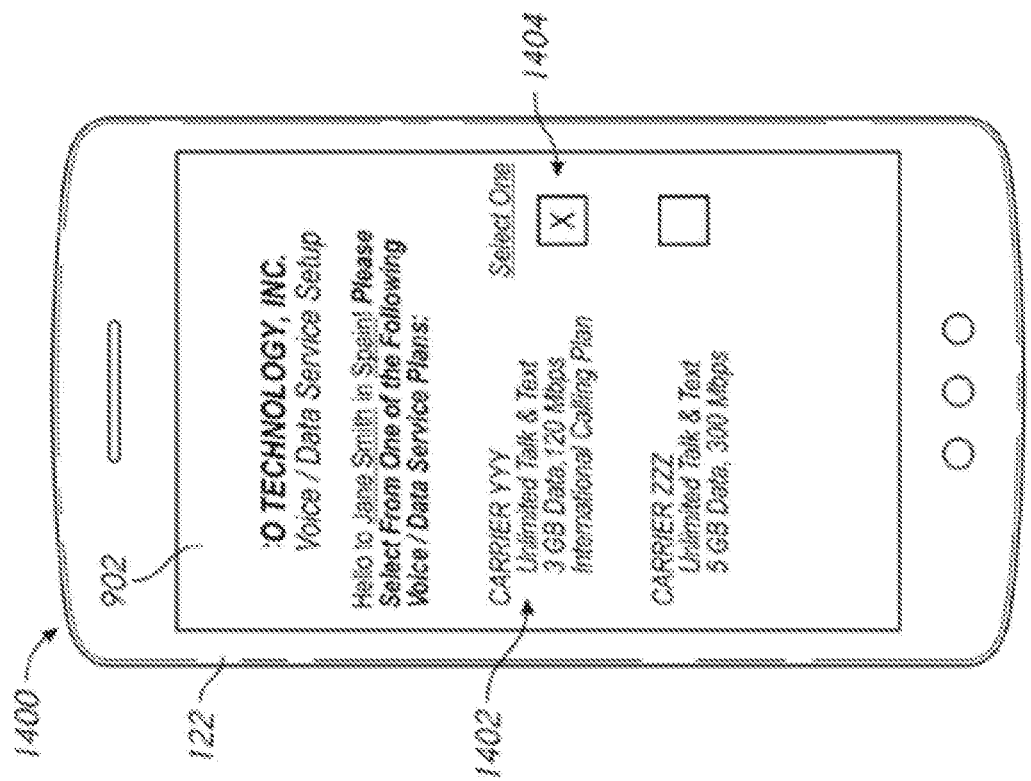
FIGS. 13 and 14 illustrate yet another pair of illustrations of the user interface of the mobile device like FIGS. 9-12, showing yet another illustrative example of information which may be conveyed using the techniques described herein, according to some aspects of the disclosed technology.
Figure 13:
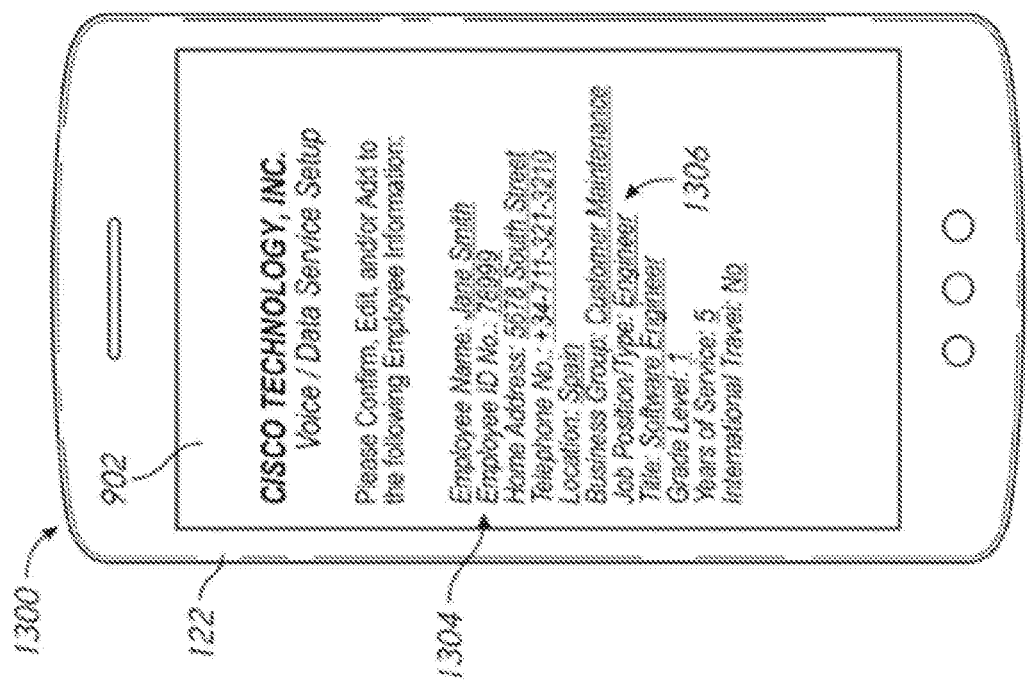

FIGS. 13 and 14

FIGS. 13 and 14 are a pair of illustrative diagrams 1300 and 1400, respectively, of the user interface of mobile device 122, showing yet another illustrative example of information which may be conveyed using the techniques described herein. More particularly, FIG. 13 shows an illustrative example of member information 1304 of yet another member (e.g. an employee named "Jane Smith") of the same enterprise (e.g. the company named "Cisco Technology, Inc."), whereas FIG. 14 shows an illustrative example of a plurality of enterprise service plan options 1402 which are selected and displayed based on member information 1304 of FIG. 13. As shown, member information 1304 of FIG. 13 may include one or more characteristics of the member and/or of the member's association or relationship with the enterprise, which are displayed in data fields 1306. Some or all of data fields 1306 of FIG. 13 may be input data fields for editing or adding to by the user of mobile device 122. In FIG. 14, the user may select one of the enterprise service plan options 1402 with use of input/selection fields 1404. Note again that member information 1304 of FIG. 13 may be provided for display in between steps 726 and 728 of the method of FIG. 7, and in between steps 826 and 828 of the method of FIG. 8, whereas enterprise service plan options 1402 of FIG. 14 may be provided for display in between steps 730 and 732 of the method of FIG. 7, and in between steps 834 and 836 of the method of FIG. 8.

FIGS. 15 and 16

FIGS. 15 and 16 are a pair of illustrative diagrams 1500 and 1600, respectively, of the user interface of mobile device 122, showing another illustrative example of information which may be conveyed using the techniques described herein. More particularly, FIG. 15 shows an illustrative example of member information 1504 of yet another member (e.g. an employee named "Fred Smith") of an enterprise (e.g. a company named "Jasper Technologies"), whereas FIG. 16 shows an illustrative example of a plurality of enterprise service plan options 1602 which are selected and displayed based on member information 1504 of FIG. 15. As shown, member information 1504 of FIG. 15 may include one or more characteristics of the member and/or of the member's association or relationship with the enterprise, which are displayed in data fields 1506. Some or all of data fields 1506 of FIG. 15 may be input data fields for editing or adding to by the user of mobile device 122. In FIG. 16, the user may select one of the enterprise service plan options 1602 with use of input/selection fields 1604. Note again that member information 1504 of FIG. 15 may be provided for display in between steps 726 and 728 of the method of FIG. 7, and in between steps 826 and 828 of the method of FIG. 8, whereas enterprise service plan options 1602 of FIG. 16 may be provided for display in between steps 730 and 732 of the method of FIG. 7, and in between steps 834 and 836 of the method of FIG. 8.

Comparing the pairs of FIGS. 9 and 10, 11 and 12, 13 and 14, and 15 and 16 with each other is illustrative. John Experta of Cisco Technology is a high-ranking, traveling manager with many years of experience (FIGS. 9 and 10), whereas John Doe of Cisco Technology has an administrative position with only a year's worth of experience (FIGS. 11 and 12). Jane Smith of Cisco Technology is a mid-level engineer (FIGS. 13 and 14) but is located in a different country (Spain) than John Experta (Northern California, USA) (FIGS. 9 and 10) and John Doe (Northern California, USA) (FIGS. 11 and 12). Fred Smith is an employee of a different enterprise (i.e. Jasper Technologies) in a software position at a location (i.e. Santa Clara, Calif.) similar to or the same as John Experta (Northern California, USA) (FIGS. 9 and 10) and John Doe (Northern California, USA) (FIGS. 11 and 12). In each example, the enterprise service plan options of a member of an enterprise are suitably selected in accordance with both the preferences of the enterprise and one or more characteristics of each member or member's association or relationship to the enterprise.

FIG. 17

Figure 17:
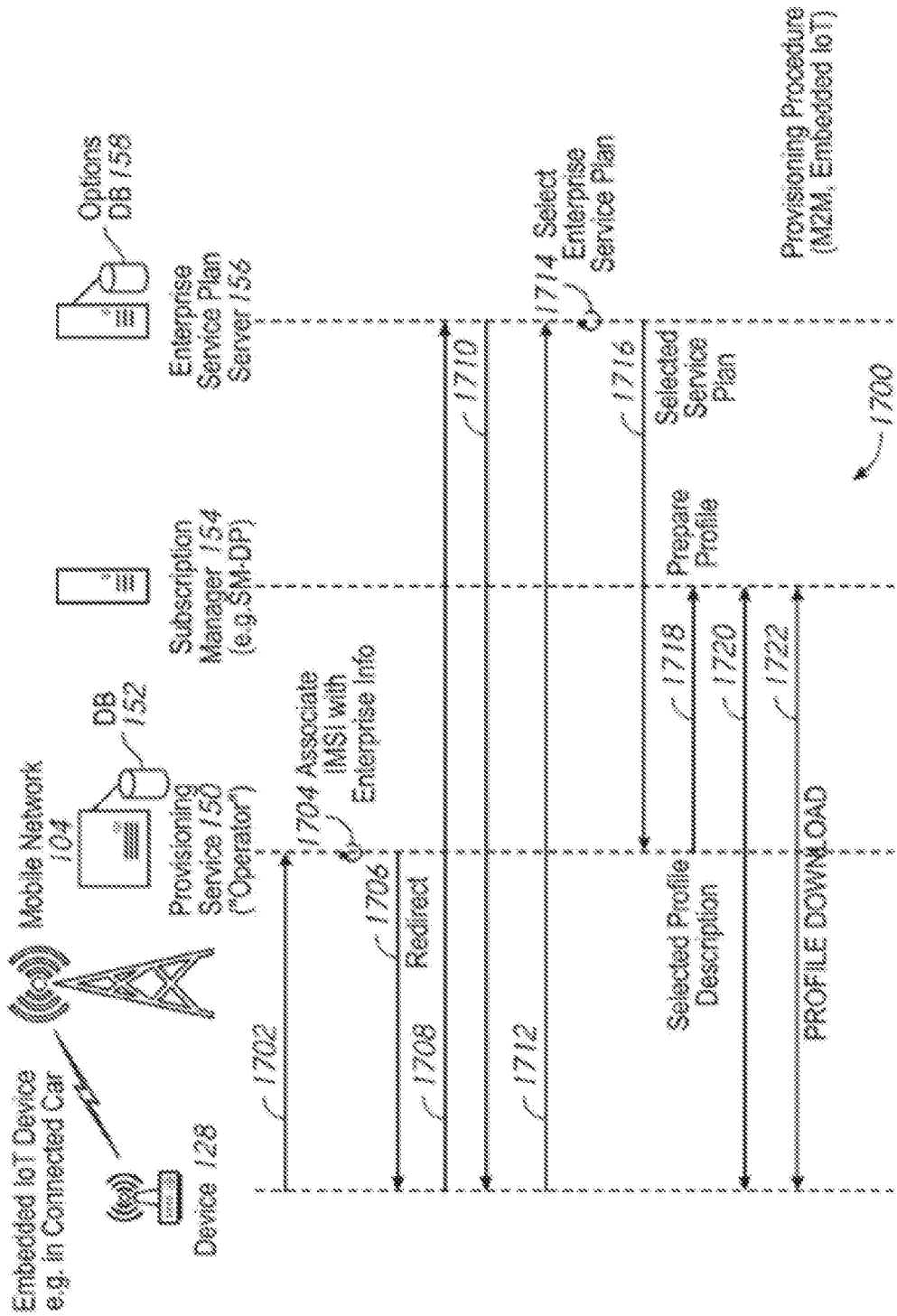
FIGS. 17 and 18 illustrate message flow diagrams for describing methods for use in remotely provisioning a SIM associated an enterprise, where the devices may be embedded Internet of Things (IoT) devices, according to some aspects of the disclosed technology.

FIG. 17 is a message flow diagram 1700 for describing a method of remotely provisioning a SIM in a communication system (e.g. communication system 100 of FIG. 1A). In particular, the method of FIG. 17 may be for use in remotely provisioning a SIM for a device (e.g. device 128), where the SIM is associated with (e.g. being owned and/or controlled by) an enterprise (i.e. a business organization) having an enterprise network (e.g. enterprise network 172). Note that device 128 may be an Internet of Things (IoT) device, such as a "connected car" device," which has no suitable or usable user interface for a user. The method of FIG. 17 may be referred to as a machine-to-machine (M2M) and/or embedded IoT procedure.

In the description of FIG. 17, provisioning service 150 (the "operator"), subscription manager 154, enterprise service plan server 156, and/or combinations thereof, may be configured to perform techniques of the present disclosure. Also in FIG. 17, enterprise service plan server 156 is configured to communicate with device 128 for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172).

In an effort to obtain communication service, a user turns on device 128 which includes a previously-unused SIM. In response, device 128 communicates one or more messages in an attempt to connect with mobile network 104 (step 1702 of FIG. 17). Mobile network 104 will serve as a default network for provisioning the device 128. In this step, device 128 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 1704 of FIG. 17).

In the present case, smart card 120 and/or device 128 may be owned and/or controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more data items including Enterprise ID 1, Enterprise Name 1, Address 1 of Server, and Credentials 1.

In response to identifying the association, provisioning service 150 causes a message to be sent to device 128 for redirecting the mobile device 122 (step 1708 of FIG. 17). Specifically, the message may redirect the device 128 to enterprise service plan server 156. For example, in step 1706, provisioning service 150 may cause one or more data items, such as Enterprise ID 1, Enterprise Name 1, Address 1 of Server, Credentials 1, or any combination of the above, to be sent to device 128. Note that the "Address 1 of Server" may be the address of enterprise service plan server 156, and the Enterprise ID 1 and the Enterprise Name 1 may identify the enterprise associated with the received IMSI of smart card 120. In response to receiving the message, device 128 may be redirected to enterprise service plan server 156, and therefore send one or more messages to enterprise service plan server 156, based on the received data items (step 1708 of FIG. 17). The enterprise service plan server 156 may respond to device 128 (step 1710 of FIG. 17) to establish a communication session with device 128.

Next, device 128 may send a request to enterprise service plan server 156 (step 1712 of FIG. 17). This request may be, for example, a request for an enterprise service plan. Enterprise service plan server 156 may receive this request. Enterprise service plan server 156 may also receive one or more characteristics of device 128, from the request or from a previous message from device 128. The one or more characteristics may be or include, for example, a device type associated with device 128. A device type may be indicative of the type of device, such as an IoT type device, a connected car type device, a drone type device, or other suitable type device.

Thereafter, enterprise service plan server 156 may access its options DB 158 to select an enterprise service plan from a plurality of service plan options (step 1714 of FIG. 17). More particularly, enterprise service plan server 156 may select an enterprise service plan in options DB 158 in accordance with the one or more characteristics of device 128. As enterprise service plan server 156 detects that device 128 is an IoT type device, it selects only a single enterprise service plan, and sends to provisioning service 150 (in contrast to device 128) a message having information identifying the selected enterprise service plan (step 1716 of FIG. 17).

Provisioning server 150 may receive the message. In response, provisioning service 150 may generate a profile description based on the selected enterprise service plan. Then, provisioning service 150 may send the profile description to the subscription manager 154 (step 1718 of FIG. 17). Subscription manager 154 may receive the profile description and, in response, may prepare a profile based on the profile description. After performing procedures for establishing a secure channel for communications with device 128 (step 1720 of FIG. 17), the profile may be remotely downloaded to device 128 for installation in the SIM (step 1722 of FIG. 17). Thus, the profile may be successfully provisioned and installed in the SIM, and the device 128 may be used for communications.

FIG. 18

Figure 18:
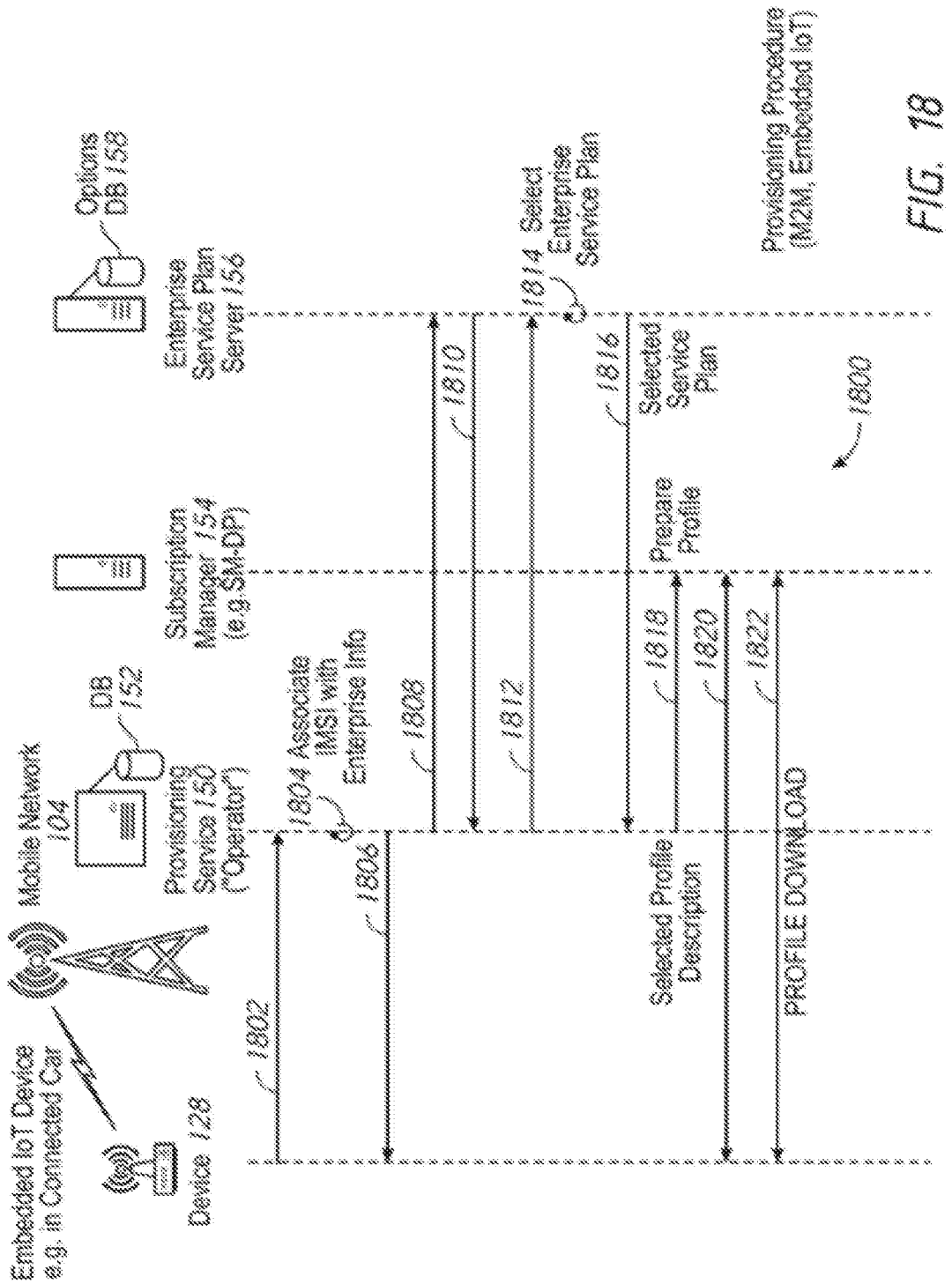

FIG. 18 is a message flow diagram 1800 for describing a method of remotely provisioning a SIM in a communication system (e.g. communication system 100 of FIG. 1A). In particular, the method of FIG. 18 may be for use in remotely provisioning a SIM for a device (e.g. device 128), where the SIM is associated with (e.g. being owned and/or controlled by) an enterprise (i.e. a business organization) having an enterprise network (e.g. enterprise network 172). Note that device 128 may be an Internet of Things (IoT) device, such as a "connected car" device," which has no suitable or usable user interface for a user. The method of FIG. 17 may be referred to as a machine-to-machine (M2M) and/or embedded IoT procedure.

In the description of FIG. 18, provisioning service 150 (the "operator"), subscription manager 154, enterprise service plan server 156, and/or combinations thereof, may be configured to perform techniques of the present disclosure. Also in FIG. 18, enterprise service plan server 156 is configured to communicate with provisioning service 150, and provisioning service 150 is configured to communicate with device 128, for selecting a suitable enterprise service plan. Use of this method may result in one or more advantages, including a reduction in the processing burden of the MNO (e.g. MNO 1 of mobile network 104) and/or a reduction in the processing burden of an enterprise network (e.g. enterprise network 172).

In an effort to obtain communication service, a user turns on device 128 which includes a previously-unused SIM. In response, device 128 communicates one or more messages in an attempt to connect with mobile network 104 (step 1802 of FIG. 18). Mobile network 104 will serve as a default network for provisioning the device 128. In this step, device 128 communicates various information to mobile network 104, including an identification of smart card 120. The identification of smart card 120 may be an International Mobile Subscriber Identity (IMSI). Provisioning service 150 receives a message corresponding to the device's access attempt, along with the IMSI of smart card 120. In response, provisioning service 150 accesses its DB 152 to identify whether information associated with the received IMSI exists (step 1804 of FIG. 18).

In the present case, smart card 120 and/or device 128 may be owned and/or controlled by an enterprise. Thus, provisioning service 150 may identify in DB 152 an association between the received IMSI of smart card 120 and enterprise information of the enterprise. For example, provisioning service 150 may identify an association between the received IMSI and enterprise information, such as one or more data items including Enterprise ID 1, Enterprise Name 1, Address 1 of Server, and Credentials 1.

In response to identifying the association, provisioning service 150 may cause a message to be sent to device 128 for confirmation/acknowledgment and/or for indicating that provisioning is required (step 1806 of FIG. 18). In addition, provisioning service 150 may send one or more messages to enterprise service plan server 156 based on the received enterprise information (step 1808 of FIG. 18). The enterprise service plan server 156 may respond to provisioning service 150 and establish a communication session with provisioning service 150 (step 1810 of FIG. 18).

Next, provisioning service 150 may send a request to enterprise service plan server 156 (step 1812 of FIG. 18). This request may be, for example, a request for an enterprise service plan for device 128. Enterprise service plan server 156 may receive this request. Enterprise service plan server 156 may also receive one or more characteristics of device 128, from the request or from a previous message from device 128. The one or more characteristics may be or include, for example, a device type associated with device 128. A device type may be indicative of the type of device, such as an IoT type device, a connected car type device, a drone type device, or other suitable type device.

Thereafter, enterprise service plan server 156 may access its options DB 158 to select an enterprise service plan from a plurality of service plan options (step 1814 of FIG. 18). More particularly, enterprise service plan server 156 may select an enterprise service plan in options DB 158 in accordance with the one or more characteristics of device 128. As enterprise service plan server 156 detects that device 128 is an IoT type device, it selects only a single enterprise service plan, and sends to provisioning service 150 a message having information identifying the selected enterprise service plan (step 1816 of FIG. 18).

Provisioning server 150 may receive the message. In response, provisioning service 150 may generate a profile description based on the selected enterprise service plan. Then, provisioning service 150 may send the profile description to the subscription manager 154 (step 1818 of FIG. 18). Subscription manager 154 may receive the profile description and, in response, may prepare a profile based on the profile description. After performing procedures for establishing a secure channel for communications with device 128 (step 1820 of FIG. 18), the profile may be remotely downloaded to device 128 for installation in the SIM (step 1822 of FIG. 18). Thus, the profile may be successfully provisioned and installed in the SIM, and the device 128 may be used for communications.

FIG. 19

FIG. 19 is a flowchart for describing a general method of provisioning a SIM. This method may be performed by a server in the network, such as an enterprise service plan server associated with one or more enterprises. Beginning at a start block 1902, a message from a mobile device or an operator in communication with the mobile device is received (step 1904 of FIG. 19). In response, information identifying one or more enterprise service plan options are selected from a plurality of service plan options in a database (DB) (step 1906 of FIG. 19). The selection of the one or more enterprise service plan options may be based on one or more characteristics of a member of the enterprise or of the member's association or relationship with the enterprise, where the member is a user of the mobile device, or any other suitable characteristics or indicators. One of the selected one or more enterprise service plan options is to be used as a basis for preparing a profile to be remotely provisioned on a SIM of the mobile device. The flowchart ends at an end block 1908.

FIG. 20

FIG. 20 is a flowchart for describing another general method of provisioning a SIM. This method may be performed by a mobile device. Beginning at a start block 2002, communication is performed with an operator network to initiate a provisioning procedure for a SIM in a mobile device (step 2004 of FIG. 20). Information identifying one or more enterprise service plan options is received from an enterprise service plan server (step 2006 of FIG. 20). These one or more enterprise service plan options may be chosen based on one or more characteristics of a member of an enterprise or of the member's association or relationship with the enterprise, where the member is a user of the mobile device. Additionally or alternatively, the one or more enterprise service plan options may be chosen based on one or more other characteristics or indicators indicative of intended contextual use (e.g. a location or geography indicator, a language indicator, a device capability indicator such as a voice and/or data communication capability indicator, etc.). One of the one or more enterprise service plan options is selected (step 2008 of FIG. 20). The selected service plan option is to be used as a basis for preparing a profile to be remotely provisioned on the SIM of the mobile device. The flowchart ends at an end block 2010.

Note that, in the several implementations described above, a SIM is described to be provisioned with a SIM profile for an enterprise for initial or first use of the mobile device. However, the same or similar techniques may be applied when the SIM is provisioned again with one or more additional or updated SIM profiles. For example, a mobile device that is used for personal use may be converted for professional or business use by reprovisioning. As another example, a user of the mobile device may lose eligibility for the existing service or gain eligibility for better service, and such changes may be provided through reprovisioning. In even another example, a first enterprise may purchase a second enterprise, where the first enterprise reprovisions all or some of the mobile devices to their liking.

FIG. 21

Figure 21:
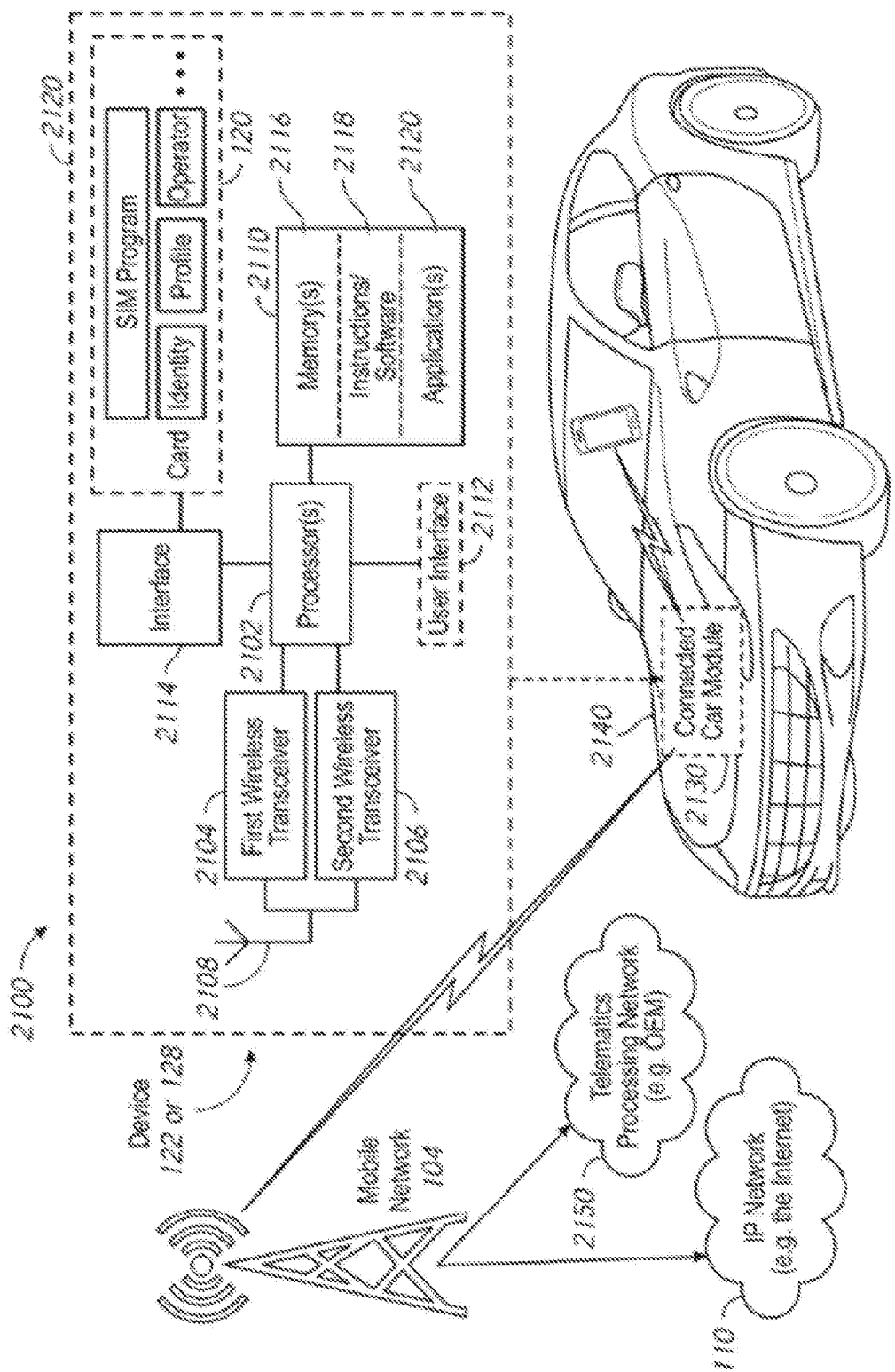
FIG. 21 illustrates a schematic block diagram of a mobile device or, alternatively, an Internet of Things (IoT) device such as a "connected car" device, according to some aspects of the disclosed technology.

FIG. 21 shows a schematic diagram 2100 of an embodiment of mobile device 122 or device 128 as described herein. Mobile device 122, which may be a smart phone or the like, has components which may include one or more processors 2102, one or more wireless transceivers such as a first wireless transceiver 2104 and a second wireless transceiver 2106, one or more antennas 2120, a memory 2110, and a user interface 2112. The components of mobile device 122 may be provided together as a single unit and, for example, contained in a mechanical housing 2120. A battery interface (not shown) may be configured to connect to one or more batteries to provide a regulated voltage (V) and electrical power to the components.

The one or more processors 2102 may be coupled to the one or more transceivers (i.e. first and second wireless transceivers 2104, 2106) and to memory 2110. Any one of these wireless transceivers may be utilized for remote SIM provisioning through a suitable network. Memory 2110 may store instructions 2118 for operation, as well as one or more applications 2120. The one or more processors 2102 are configured to operate according to the instructions 2118 to perform basic operations, as well as to perform techniques of the present disclosure.

First and second wireless transceivers 2104 and 2106 are coupled to the one or more antennas 2108 for wireless communications. One or more processors 2102 are configured to operate first wireless transceiver 2104 to provide wireless communications in accordance with a first communication protocol or standard, and configured to operate second wireless transceiver 2106 to provide wireless communications in accordance with a second communication protocol or standard. In some implementations, the first communication protocol may be a Wi-Fi or WLAN protocol, which may be described in a group of specifications developed by the Institute of Electrical and Electronics Engineers (IEEE) referred to collectively as the IEEE 802.11 standard. The second communication protocol may be any suitable cellular telecommunications protocol or standard described in one of several various specifications.

The one or more processors 2102 are also coupled to user interface 2112. User interface 2112 may be or include any suitable type of user interface, such as a visual display, a touch screen display, a keyboard or keypad, hard and/or soft buttons, for user interaction. The one or more processors 2102 are also coupled to smart card interface 2114, which is configured to receive and provide connection with a smart card (e.g. smart card 120).

In FIG. 21, instead of the device being a mobile device 122 (e.g. a smart phone), the device may be a device 128 which is an Internet of Things (IoT) device, such as a "connected car" device. In FIG. 21, device 128 is shown in context within an illustrative system environment, namely, a "connected car" environment.

A connected car 2140 may have a connected car module 2130 which includes device 128 to provide a mobile hotspot in the vehicle. Connected car module 2130 may be a vehicle control module, which has connected car functionality. Using the connected car module 2130, communication devices may access voice and/or data communication services and the network 110 (e.g. the Internet). Connected car module 2130 may also provide for telematics processing and communication with a telematics processing network 2150 (e.g. of or associated with the OEM) via mobile network 104.

Note that, the schematic diagram 2100 of device 128 may generally be the same as or similar to mobile device 122 previously described, but without a suitable/usable user interface 2112.

FIG. 22

Figure 22:
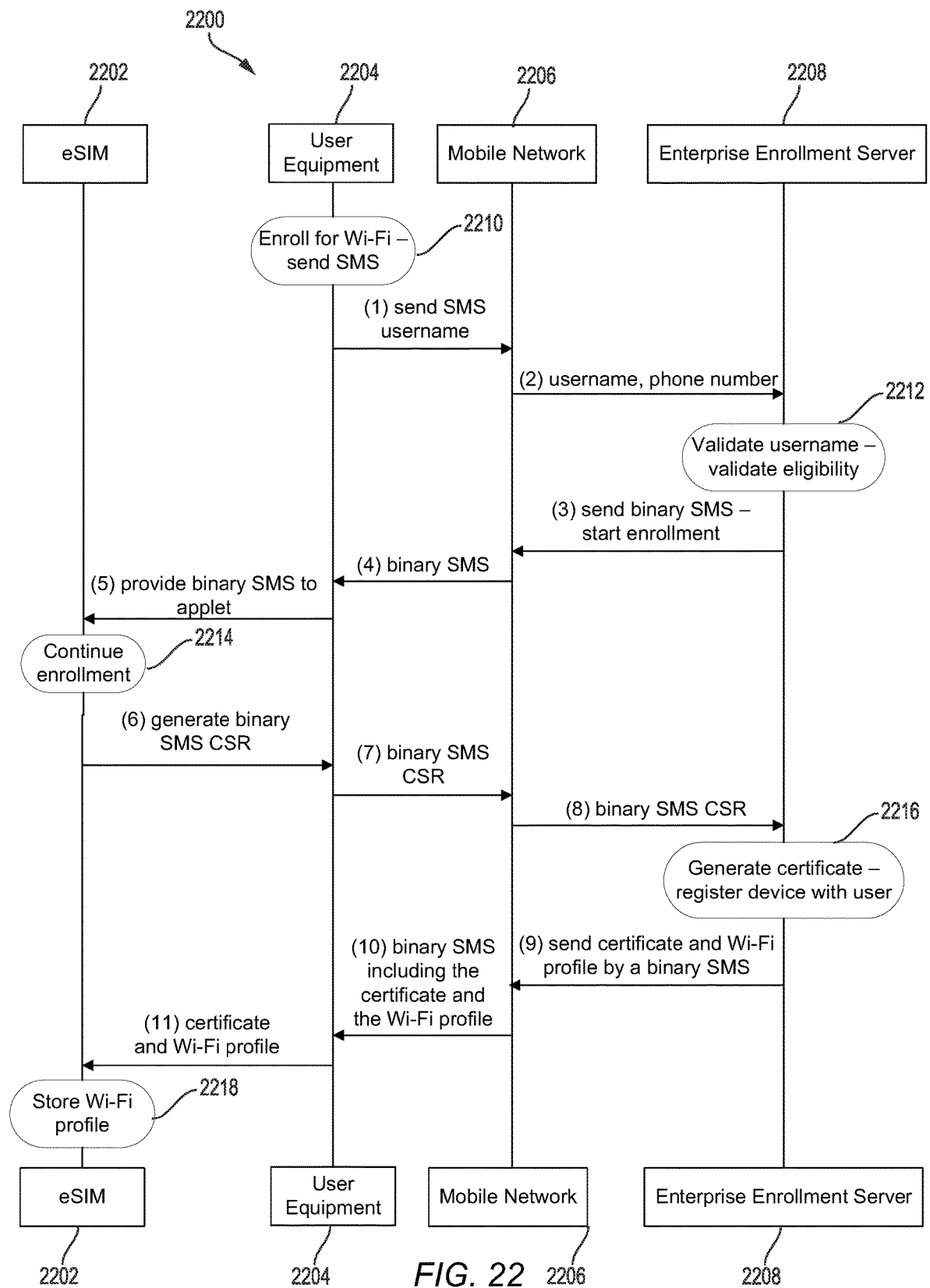
FIG. 22 illustrates a flowchart for a Wi-Fi onboarding process of a user equipment utilizing an embedded Subscriber Identity Module (eSIM), according to some aspects of the disclosed technology.

FIG. 22 illustrates a flowchart for a Wi-Fi onboarding process of a user equipment utilizing an embedded Subscriber Identity Module (eSIM) 2200, according to some aspects of the disclosed technology. The Wi-Fi onboarding process 2200 may be performed at least in part by a user equipment 2204 having an eSIM 2202, a network 2206, and an enrollment server of an enterprise network 2208. In some instances, the user equipment 2204 can be a cellular device, a mobile device, a cellular phone, a mobile phone, a laptop, a mobile computer, a tablet, or any other device suitable for the intended purpose and understood by a person of ordinary skill in the art. In other instances, the network 2206 can be a mobile network, a cellular network, or any other network suitable for the intended purpose and understood by a person of ordinary skill in the art. In some instances, the server 2208 can be an enrollment server 2208 of an enterprise network or any other server of a type of network suitable for the intended purpose and understood by a person of ordinary skill in the art.

Before an endpoint can connect to the nodes of a computer network, a device may go through an onboarding process. Onboarding cellular devices may be quick and seamless for users as cellular devices have network credentials stored on the SIM card/eSIM. As a result, a user does not have to manually enter any credentials to enable access to a cellular network. The same is not true for cellular devices attempting to access a Wi-Fi network. Instead, users have to go through various complicated steps including manually entering credentials in order to onboard cellular devices onto a Wi-Fi network. Therefore, a need exists for a more seamlessly onboarding process of a device, and in particular a cellular device, onto a Wi-Fi network.

The Wi-Fi onboarding process 2200 can involve the network 2206 authenticating the user equipment/device 2204 (or a user of the device) and authorizing access to a segment of the mobile network 2206 depending on the rights or privileges of the user, the type of the user equipment 2204, and/or a specific identity of the user equipment 2204 itself. Authentication can entail an exchange of information known between the user equipment 2204 and the mobile network 2206, such as a password or key, or information specifically unique to the user equipment 2204 and verified by a trusted third party, such as a certificate. Another example of unique information of a device is a Subscriber Identity Module (SIM), which may be removable from the device (e.g., a SIM card) or permanently affixed to the device (e.g., an embedded SIM or eSIM).

At step (1), the Wi-Fi onboarding process 2200 can include initiating Wi-Fi enrollment 2210 of the cellular device or user equipment 2204 by providing a Short Message Service (SMS) message to the mobile network 2206. In some instances, the SMS message can include a username, a phone number, enrollment server selection, or any other information suitable for the intended purpose and understood by a person of ordinary skill in the art. Other examples of information and data that can be included in the SMS message are <enroll-request>, <username> JohnDoe </username>, <ssid>employee</ssid>, and </enroll-request>. In other instances, the phone number of the user equipment 2204 can be added to the SMS message by the mobile network 2206.

In some instances, in the case of headless device (e.g., a device without a human interface), the destination for the SMS message may be pre-programmed. In the case of a headed device (e.g., a device with a human interface), the destination for the SMS message can be entered by a user.

At step (2), the Wi-Fi onboarding process 2200 can include the mobile network 2206 providing information of the user equipment 2204 to the enrollment server 2208. In some instances, the information of the user equipment 2204 can include one or more of the username and the phone number of the user equipment 2204.

In other instances, the enrollment server 2208 can validate the username of the user equipment 2204 and validate eligibility of the user equipment 2204 by determining whether the user equipment 2204 is authorized to enroll in Wi-Fi onboarding 2212. If the user equipment 2204 is authorized to proceed with the Wi-Fi onboarding process 2200, the enrollment server 2208 may continue by generating an SMS message to be provided to the corresponding user equipment 2204.

In some cases, the eSIM or the SIM card 2202 of the user equipment 2204 can be associated with an enterprise account. For example, the SMS message can include information relating to a specified enrollment server 2208 such that the mobile network 2206 provides the SMS message to the enrollment server specified in the SMS message.

In other cases, the user equipment 2204 and the mobile network 2206 may have an arrangement with the enterprise network to forward SMS messages including Wi-Fi onboarding requests to the enrollment server 2208 (e.g., via a Restful State Transfer (REST) Application Programming Interface (API)). For example, the mobile network 2206 may have an arrangement with a specified enrollment server 2208 such that SMS messages including a Wi-Fi onboarding request may be provided to the specified enrollment server 2208. In some instances, the enrollment server 2208 may have a preexisting relationship with the mobile network 2206 such that information received from the mobile network 2206 is automatically trusted by the enrollment server 2208, thereby expediting the Wi-Fi onboarding process 2200 by removing another step of authorization from the Wi-Fi onboarding process 2200.

At step (3), the Wi-Fi onboarding process 2200 can include the enrollment server 2208 providing an SMS message to the mobile network 2206, which may signify a start to a Wi-Fi enrollment process. In some instances, step (3) may be initiated after the enrollment server 2208 approves the user equipment 2204 for Wi-Fi onboarding. In other instances, the SMS message to begin the start of the Wi-Fi enrollment process may be a binary SMS message or any other SMS message suitable for the intended purpose and understood by a person of ordinary skill in the art. In some instances, the binary SMS message can include a request for a certificate signing request from the user equipment 2204 to generate a corresponding certificate.

Though the binary SMS message may be binary, the binary SMS message need not be binary. The SMS message that begins the start of the Wi-Fi enrollment process may be a non-binary SMS message or any other SMS message suitable for the intended purpose and understood by a person of ordinary skill in the art. A binary SMS message may include fewer bytes. The binary SMS can include information and data including <enroll-response>, <status>success</success>, <csr-request>, <param>one or more parameters may be listed, </param>, </csr-request>, and </enroll-response>. The binary SMS message may be provided to acknowledge receipt of an enrollment request and to request the certificate signing request from the user equipment 2204.

At step (4), the Wi-Fi onboarding process 2200 can include the mobile network 2206 providing the binary SMS message received from the enrollment server 2208 to the user equipment 2204.

At step (5), the Wi-Fi onboarding process 2200 can include the user equipment 2204 providing the binary SMS message to the eSIM 2202. In some instances, the user equipment 2204 can provide the binary SMS message to an applet of the eSIM 2202. In such instances, the eSIM 2202 may be configured to execute applications and/or applets on dedicated hardware or software of the eSIM 2202.

At step (6), the Wi-Fi onboarding process 2200 can include the eSIM 2202 generating a binary SMS certificate signing request (CSR) to continue the Wi-Fi enrollment process 2214. Step (6) of the Wi-Fi onboarding process 2200 can further include providing the binary SMS CSR to the user equipment 2204.

In some instances, the CSR can include a public key associated with a public/private key pair of the eSIM 2202 that can be utilized by the enrollment server 2208 to generate a certificate for the user equipment 2204. Moreover, the public key can include information relating to the certificate signing request that may be provided to the enrollment server 2208.

At step (7), the Wi-Fi onboarding process 2200 can include the user equipment 2204 providing the binary SMS CSR to the mobile network 2206.

At step (8), the Wi-Fi onboarding process 2200 can include the mobile network 2206 providing the binary SMS CSR to the enrollment server 2208. In some instances, the enrollment server 2208 can utilize the binary SMS CSR received from the user equipment 2204 to generate a certificate and register the user equipment 2204 with the user 2216. For example, the enrollment server 2208 can update or revise an authorized list (e.g., a whitelist) for a corresponding WLAN that may be associated with the enterprise network to include the user equipment 2204.

At step (9), the Wi-Fi onboarding process 2200 can include the enrollment server 2208 providing a binary SMS message including Wi-Fi login data. The Wi-Fi login data can include a Wi-Fi profile and the generated certificate for the user equipment 2204 to the mobile network 2206. The Wi-Fi profile can include a list of one or more Wi-Fi profiles that the user equipment 2204 is authorized to access. For example, the Wi-Fi profile can include a list of airport Wi-Fi that the user equipment 2204 may access. In some instances, the certificate generated by the enrollment server 2208 can provide access to the Wi-Fi profile for the user equipment 2204. For example, the certificate can be used to authenticate the user equipment 2204, and not a username/password combination.

At step (10), the Wi-Fi onboarding process 2200 can include the mobile network 2206 providing the Wi-Fi profile and the certificate to the user equipment 2204 by a binary SMS message.

At step (11), the Wi-Fi onboarding process 2200 can include the user equipment 2204 providing the Wi-Fi profile and the certificate to the eSIM 2202. In some instances, the eSIM 2202 can store the Wi-Fi profile and the certificate for connecting the user equipment 2204 to the designated WLAN as set forth in the Wi-Fi profile for future use.

In some instances, the combination of the eSIM's 2202 ability to execute applications and applets and utilize binary SMS messages can allow an enterprise network to provision Wi-Fi credentials to user equipment 2202 that include cellular capabilities. In other instances, the eSIM 2202 can store both the Wi-Fi profile and a cellular profile of the user equipment 2202 to allow the user equipment 2202 to quickly and seamlessly connect to either or both of the Wi-Fi network and the mobile network 2206. Additionally, by storing both profiles of the Wi-Fi and cellular network on the eSIM 2202, the user equipment 2202 can be configured to seamlessly switch between the Wi-Fi network and the cellular/mobile network 2206.

In other instances, Wi-Fi profiles can be updated and initiated by the user equipment 2204, the mobile network 2206, and/or the enrollment server 2208. In some instances, the certificates associated with the Wi-Fi profile may be updated accordingly to renew the certificate.

In some instances, the user equipment 2204 can include a reset feature such that initiation of the rest feature removes the Wi-Fi profile and certificate from the eSIM, thereby removing access to the Wi-Fi network from the user equipment 2204.

FIG. 23

Figure 23:
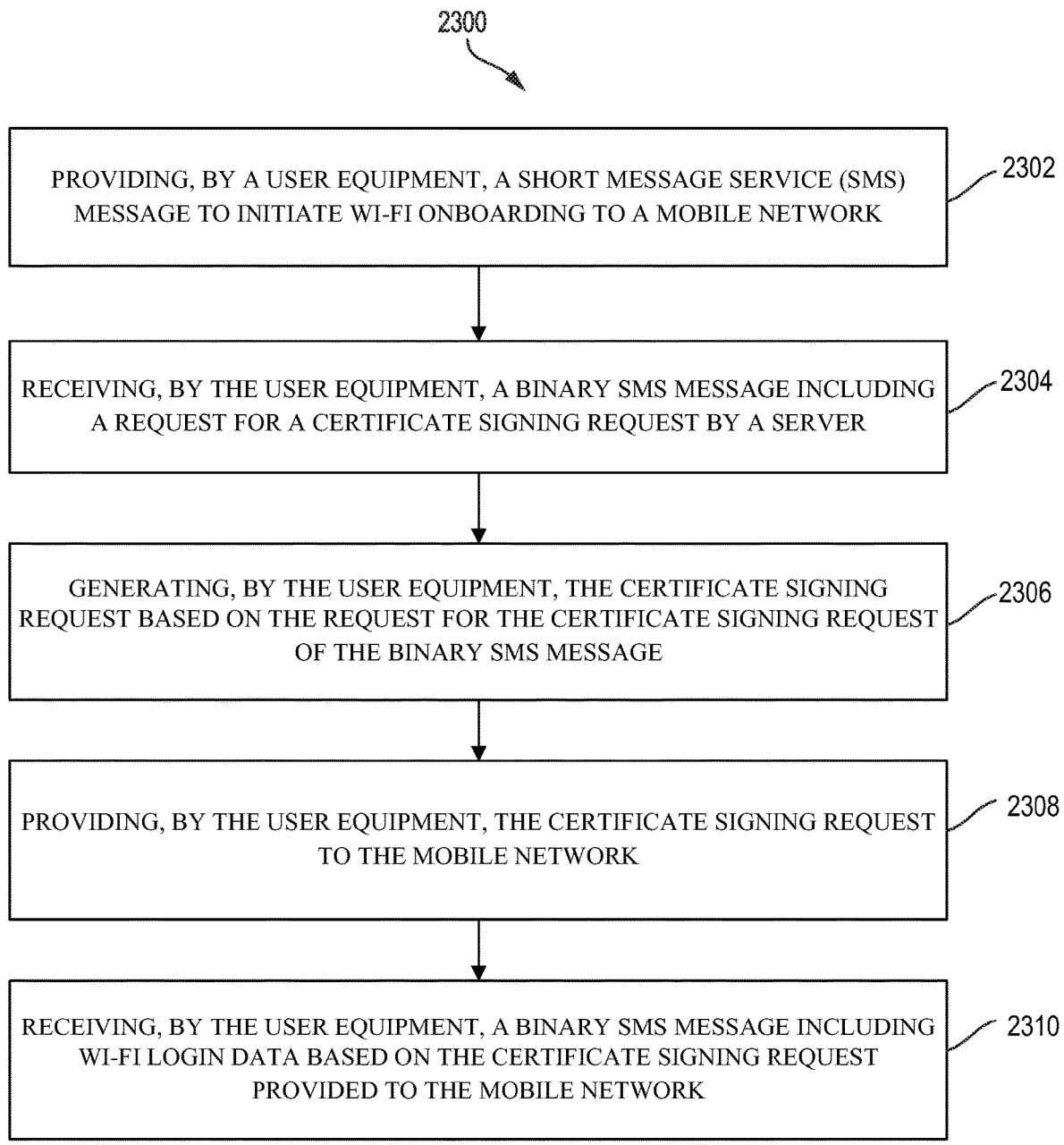
FIG. 23 illustrates an example process for Wi-Fi onboarding of a user equipment, according to some aspects of the disclosed technology.

Having disclosed some example system components and concepts, the disclosure now turns to FIG. 23, which illustrate example method 2300 for Wi-Fi onboarding of a user equipment. The steps outlined herein are exemplary and can be implemented in any combination thereof, including combinations that exclude, add, or modify certain steps.

At step 2302, the method 2300 can include providing, by a user equipment, a short message service (SMS) message to initiate Wi-Fi onboarding to a mobile network.

In some instances, the SMS message to initiate the Wi-Fi onboarding can include a username associated with the user equipment.

At step 2304, the method 2300 can include receiving, by the user equipment, a binary SMS message including a request for a certificate signing request by a server.

In some instances, the binary SMS message including the request for the certificate signing request can be provided to an embedded Subscriber Identity Module (eSIM) of the user equipment. In other instances, the binary SMS message including the request for the certificate signing request can be provided to an applet of the eSIM of the user equipment.

At step 2306, the method 2300 can include generating, by the user equipment, the certificate signing request based on the request for the certificate signing request of the binary SMS message.

At step 2308, the method 2300 can include providing, by the user equipment, the certificate signing request to the mobile network.

At step 2310, the method 2300 can include receiving, by the user equipment, a binary SMS message including Wi-Fi login data based on the certificate signing request provided to the mobile network.

In some instances, the Wi-Fi login data can include a certificate and a Wi-Fi profile for the user equipment.

In other instances, the method 2300 can further include renewing the Wi-Fi login data based on an updating message received by the user equipment.

In some instances, the mobile network and the server include a pre-existing relationship of authentication between the mobile network and the server.

FIG. 24

Figure 24:
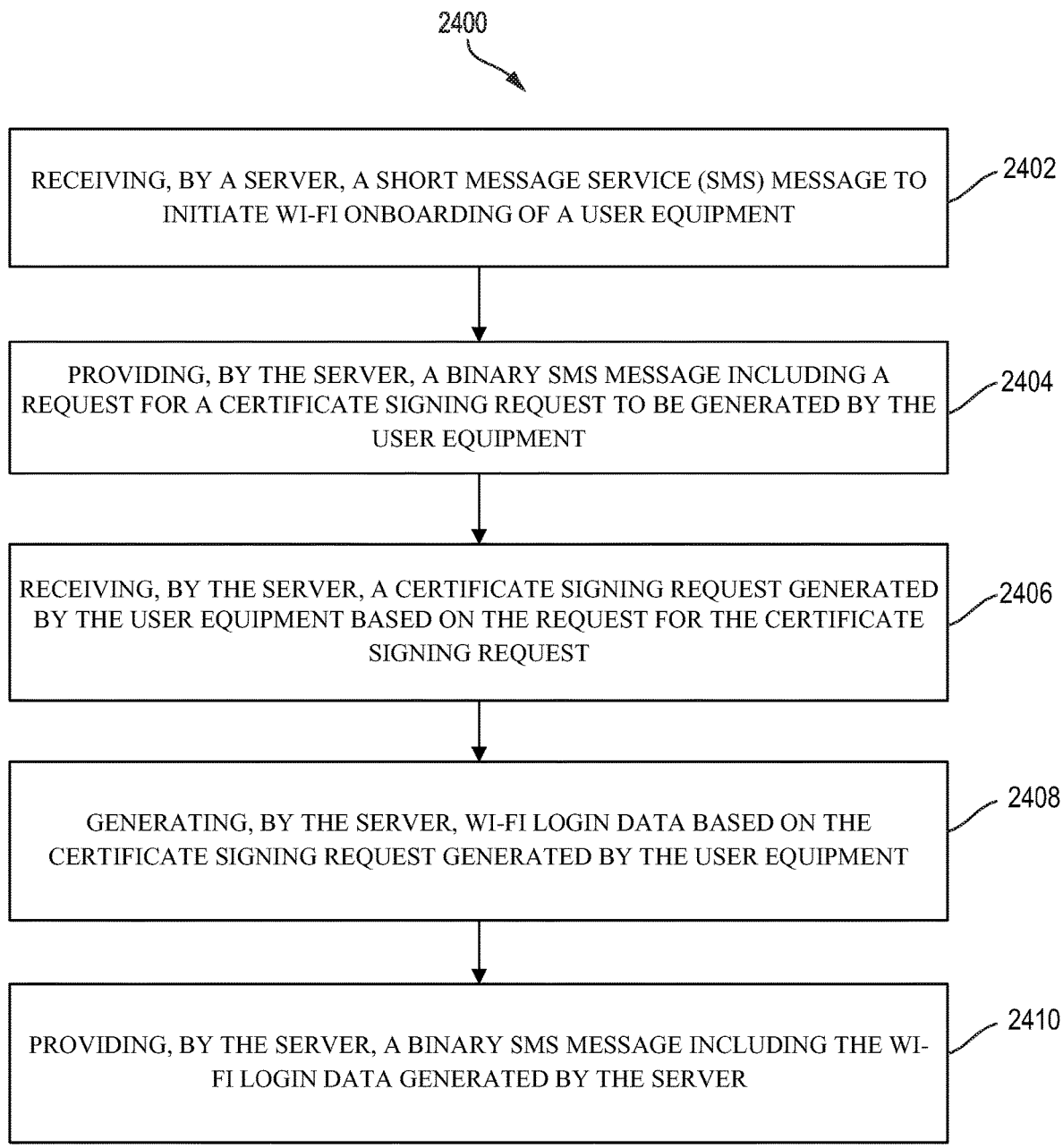
FIG. 24 illustrates an example process for Wi-Fi onboarding by a server, according to some aspects of the disclosed technology.

Having disclosed some example system components and concepts, the disclosure now turns to FIG. 24, which illustrate example method 2400 for Wi-Fi onboarding by a server. The steps outlined herein are exemplary and can be implemented in any combination thereof, including combinations that exclude, add, or modify certain steps.

At step 2402, the method 2400 can include receiving, by a server, a short message service (SMS) message to initiate Wi-Fi onboarding of a user equipment.

In some instances, the SMS message to initiate the Wi-Fi onboarding can include a username and a phone number associated with the user equipment.

At step 2404, the method 2400 can include providing, by the server, a binary SMS message including a request for a certificate signing request to be generated by the user equipment.

In some instances, the binary SMS message including the request for the certificate signing request can be provided to an embedded Subscriber Identity Module (eSIM) of the user equipment. In other instances, the binary SMS message including the request for the certificate signing request can be provided to an applet of the eSIM of the user equipment.

At step 2406, the method 2400 can include receiving, by the server, a certificate signing request generated by the user equipment based on the request for the certificate signing request.

At step 2408, the method 2400 can include generating, by the server, Wi-Fi login data based on the certificate signing request generated by the user equipment.

In some instances, the Wi-Fi login data can include a certificate and a Wi-Fi profile for the user equipment.

At step 2410, the method 2400 can include providing, by the server, a binary SMS message including the Wi-Fi login data generated by the server.

In some instances, the method 2400 can further include renewing the Wi-Fi login data based on an updating message provided by the server.

In other instances, the mobile network and the server can include a pre-existing relationship of authentication between the mobile network and the server.

FIG. 25

Figure 25:
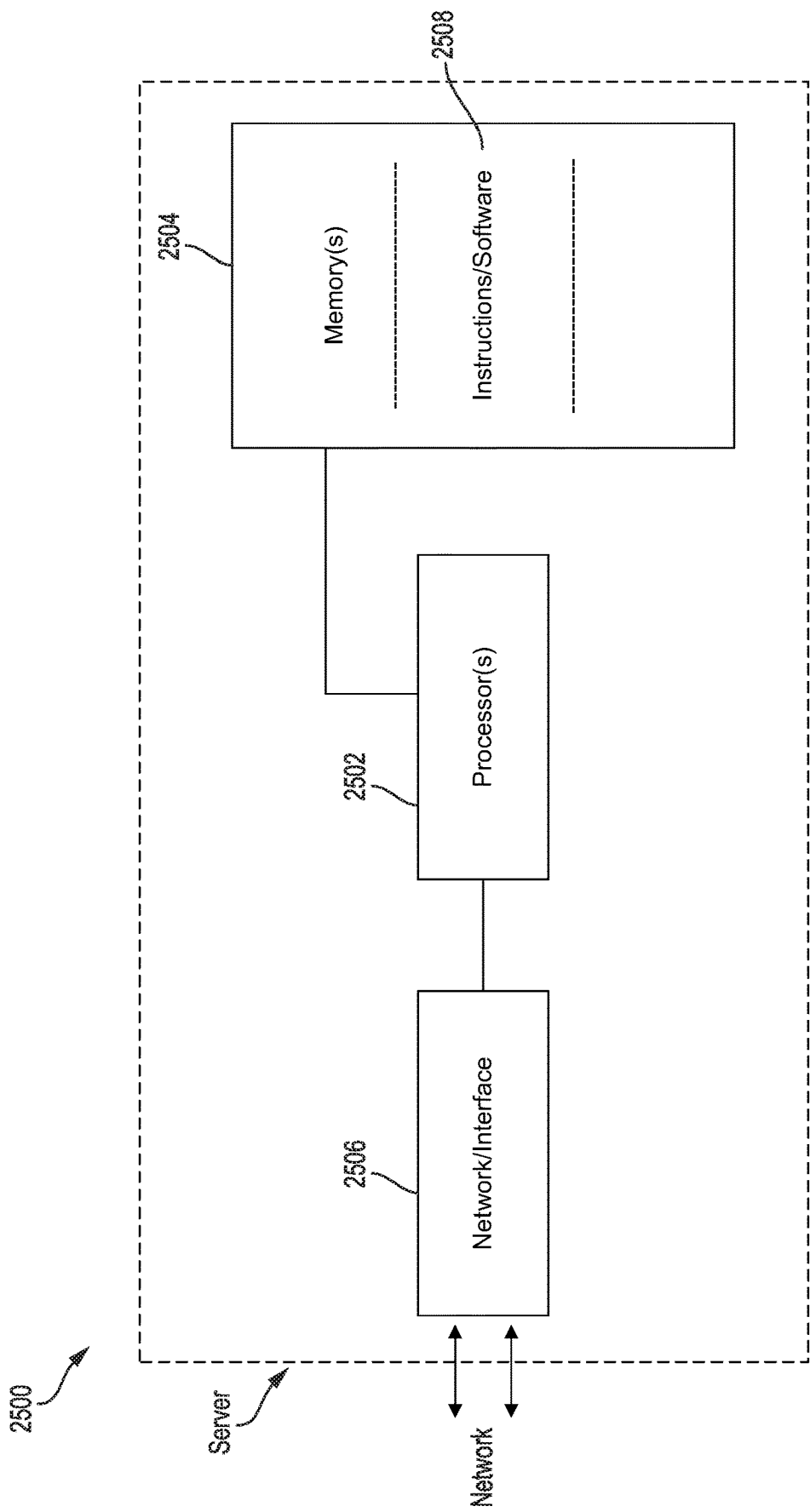
FIG. 25 illustrates a block diagram illustrating applicable components of a server, such as an enterprise service plan server, which may execute techniques of the present disclosure.

FIG. 25 shows a block diagram 2500 of basic pertinent components of a server, such as a server in a provisioning service (e.g. provisioning service 150 of FIG. 1A) or an enterprise service plan server (e.g. enterprise service plan server 156 of FIG. 1A). The server of FIG. 25 has components which may include one or more processors 2502 which are coupled to memory 2504 and to a network interface 2506. Network interface 2506 is configured to connect to a communication network for communications in a network, such as network 110 of FIG. 1A. The one or more processors 2502 of the server are configured to operate according to instructions 2508 stored in memory 2504, in order to perform basic operations as well as to perform techniques of the present disclosure.

As provided herein, techniques for use in remotely provisioning a Subscriber Identity Module (SIM) of a mobile device for an enterprise have been described. In one illustrative example, at an enterprise server, a message is received from the mobile device or an operator in communication with the mobile device. In response, one or more enterprise service plan options are selected from a plurality of service plan options and sent to the mobile device or the operator. One of the selected enterprise service plan options is selected, for use in preparing a profile to be remotely provisioned on the SIM. The one or more enterprise service plan options may be selected based on one or more characteristics of a member of the enterprise and/or the member's association or relationship with the enterprise, and/or other characteristics or indicators indicative of intended contextual use (e.g. a location or geography indicator, a language indicator, a device capability indicator such as a voice and/or data communication capability indicator, etc.).

In another illustrative example, an enterprise server module for remote SIM provisioning (e.g. an Enterprise Policy for SIM Profile Selection (EP-SPS) module) has a first interface for communication with one or more mobile network operators, a second interface for communication with a Subscription Manager Data Preparation (SM-DP) module, and a third interface for communication with an end user of a mobile device for which a SIM is provisioned based on a selected service plan option.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A computer-implemented method comprising:
first providing, by a user equipment, a short message service (SMS) message, the message identifying a server in a private enterprise network, to initiate Wi-Fi onboarding through a mobile network that is distinct from a Wi-Fi network;
receiving, by the user equipment from the server in the private enterprise network, a binary SMS message including a request for a certificate signing request;
second providing, in response to the receiving, by the user equipment to an embedded Subscriber Identity Module (eSIM) associated with the user equipment, the binary SMS message, wherein the eSIM is specific to the private enterprise network;
generating, in response to the second providing, by the eSIM, a certificate signing request based on the request for the certificate signing request of the binary SMS message;
third providing, in response to the generating, the certificate signing request from the user equipment to the server through the mobile network based on both the eSIM and the in the private enterprise network; and
receiving, by the user equipment, a binary SMS message including Wi-Fi login data based on the certificate signing request provided to the mobile network;
logging in the user equipment to the Wi-Fi network using the received Wi-Fi login data.

2. The computer-implemented method of claim 1, wherein the SMS message to initiate the Wi-Fi onboarding includes a username associated with the user equipment.

3. The computer-implemented method of claim 1, wherein the binary SMS message including the request for the certificate signing request is provided to an applet of the eSIM of the user equipment.

4. The computer-implemented method of claim 1, wherein the Wi-Fi login data includes a certificate and a Wi-Fi profile for the user equipment.

5. The computer-implemented method of claim 1, further comprising renewing the Wi-Fi login data based on an updating message received by the user equipment.

6. The computer-implemented method of claim 1, wherein the mobile network and the server include a pre-existing relationship of authentication between the mobile network and the server.

7. A system comprising:
one or more processors; and
at least one computer-readable storage medium having stored therein instructions which, when executed by the one or more processors, cause the system to:
first provide a short message service (SMS) message to initiate Wi-Fi onboarding through a mobile network that is distinct from a Wi-Fi network;
receive a binary SMS message including a request for a certificate signing request by a server specific to an enterprise associated with user equipment;
second provide, in response to the receive, by the user equipment to an embedded Subscriber Identity Module (eSIM) associated with the user equipment, the binary SMS message, wherein the eSIM is specific to the enterprise associated with the user equipment;
generate, in response to the second provide, by the eSIM, a certificate signing request based on the request for the certificate signing request of the binary SMS message;
third provide, in response to the generate, the certificate signing request from the user equipment to the server through the mobile network based on both the eSIM and the server being specific to the enterprise; and
receive a binary SMS message including Wi-Fi login data based on the certificate signing request provided to the mobile network.

8. The system of claim 7, wherein the SMS message to initiate the Wi-Fi onboarding includes a username associated with a user equipment.

9. The system of claim 7, wherein the binary SMS message including the request for the certificate signing request is provided to an applet of the eSIM of the user equipment.

10. The system of claim 7, wherein the Wi-Fi login data includes a certificate and a Wi-Fi profile for a user equipment.

11. The system of claim 7, further comprising renewing the Wi-Fi login data based on an updating message received by a user equipment.

12. The system of claim 7, wherein the mobile network and the server include a pre-existing relationship of authentication between the mobile network and the server.

13. A non-transitory computer-readable storage medium comprising:
instructions stored on the non-transitory computer-readable storage medium, the instructions, when executed by one more processors, cause the one or more processors to:
first provide a short message service (SMS) message to initiate Wi-Fi onboarding through a mobile network that is distinct from a Wi-Fi network;
receive a binary SMS message including a request for a certificate signing request by a server specific to an enterprise associated with the user equipment;
second provide, in response to the receive, by the user equipment to an embedded Subscriber Identity Module (eSIM) associated with the user equipment, the binary SMS message, wherein the eSIM is specific to the enterprise associated with user equipment;
generate, in response to the provide, by the eSIM, a certificate signing request based on the request for the certificate signing request of the binary SMS message;
third provide, in response to generate, the certificate signing request from the user equipment to the server through the mobile network based on both the eSIM and the server being specific to the enterprise; and
receive a binary SMS message including Wi-Fi login data based on the certificate signing request provided to the mobile network.

14. The non-transitory computer-readable storage medium of claim 13, wherein the SMS message to initiate the Wi-Fi onboarding includes a username associated with a user equipment.

15. The non-transitory computer-readable storage medium of claim 13, wherein the binary SMS message including the request for the certificate signing request is provided to an applet of the eSIM of the user equipment.

16. The non-transitory computer-readable storage medium of claim 13, wherein the Wi-Fi login data includes a certificate and a Wi-Fi profile for a user equipment.

17. The non-transitory computer-readable storage medium of claim 13, further comprising renewing the Wi-Fi login data based on an updating message received by a user equipment.

18. The non-transitory computer-readable storage medium of claim 13, wherein the mobile network and the server include a pre-existing relationship of authentication between the mobile network and the server.

19. The computer-implemented method of claim 1, further comprising providing the Wi-Fi login data to the eSIM, wherein the eSIM is configured to store the Wi-Fi login data for connecting the user equipment to the mobile network.

20. The system of claim 7, wherein the instructions, which when executed by the one or more processors, further cause the system to provide the Wi-Fi login data to the eSIM, wherein the eSIM is configured to store the Wi-Fi login data for connecting the user equipment to the mobile network.

* * * * *